United States Patent
Zeine et al.

(10) Patent No.: US 10,425,131 B2
(45) Date of Patent: Sep. 24, 2019

(54) BEACON LOCALIZATION FOR A CLIENT DEVICE IN WIRELESS ENVIRONMENT APPLICATIONS

(71) Applicant: Ossia Inc., Bellevue, WA (US)

(72) Inventors: Hatem Ibrahim Zeine, Bellevue, WA (US); Ahmad Moghaddam, Kirkland, WA (US)

(73) Assignee: Ossia Inc., Bellevue, WA (US)

( * ) Notice: Subject to any disclaimer, the term of this patent is extended or adjusted under 35 U.S.C. 154(b) by 16 days.

(21) Appl. No.: 15/480,796

(22) Filed: Apr. 6, 2017

(65) Prior Publication Data
US 2018/0295557 A1 Oct. 11, 2018

(51) Int. Cl.
| | |
|---|---|
| H04B 7/04 | (2017.01) |
| H04B 17/318 | (2015.01) |
| H02J 50/40 | (2016.01) |
| H02J 50/20 | (2016.01) |
| H04B 17/27 | (2015.01) |
| H04B 5/00 | (2006.01) |
| H02J 50/90 | (2016.01) |
| H04B 17/364 | (2015.01) |

(52) U.S. Cl.
CPC .............. *H04B 7/04* (2013.01); *H02J 50/20* (2016.02); *H02J 50/40* (2016.02); *H02J 50/90* (2016.02); *H04B 5/0037* (2013.01); *H04B 17/27* (2015.01); *H04B 17/318* (2015.01); *H04B 17/364* (2015.01)

(58) Field of Classification Search
None
See application file for complete search history.

(56) References Cited

U.S. PATENT DOCUMENTS

| | | | |
|---|---|---|---|
| 8,159,364 B2 | 4/2012 | Zeine | |
| 8,410,953 B2 | 4/2013 | Zeine | |
| 8,446,248 B2 | 5/2013 | Zeine | |
| 8,558,661 B2 | 10/2013 | Zeine | |
| 8,618,770 B2 * | 12/2013 | Baarman | H02J 5/005 |
| | | | 320/108 |
| 8,854,176 B2 | 10/2014 | Zeine | |
| 9,942,788 B1 * | 4/2018 | Zeine | H04W 24/08 |

(Continued)

FOREIGN PATENT DOCUMENTS

KR 1020140082628 A 7/2014

OTHER PUBLICATIONS

International Application No. PCT/US2017/063925, International Search Report & Written Opinion, 13 pages, dated Mar. 13, 2018.

*Primary Examiner* — David Bilodeau

(57) ABSTRACT

A method of operating a transceiver system includes receiving, from a client power receiver, a signal at a plurality of antenna elements of an antenna array. The method also includes determining, by at least one of the antenna array and a processor of the transceiver system, and based at least in part on a fixed geometry of the plurality of antenna elements, a value of at least one waveform characteristic of the received signal. The method further includes computing, by the processor and based on the determined value of the at least one waveform characteristic, a transmission path of the signal from the client power receiver to each antenna element. The method also includes, assigning, by the processor and based on the computed transmission path, a location of the client power receiver in a wireless data transmission and power delivery environment.

20 Claims, 14 Drawing Sheets

(56) References Cited

U.S. PATENT DOCUMENTS

| | | | |
|---|---|---|---|
| 2006/0113955 A1* | 6/2006 | Nunally | H02J 7/025 |
| | | | 320/108 |
| 2011/0287801 A1* | 11/2011 | Levin | H04B 17/391 |
| | | | 455/517 |
| 2015/0042526 A1 | 2/2015 | Zeine | |
| 2015/0171513 A1 | 6/2015 | Chen et al. | |
| 2015/0333800 A1 | 11/2015 | Perry et al. | |
| 2016/0033254 A1 | 2/2016 | Zeine et al. | |
| 2016/0156388 A1 | 6/2016 | Zeine et al. | |
| 2016/0299210 A1 | 10/2016 | Zeine | |
| 2016/0299549 A1 | 10/2016 | Zeine et al. | |
| 2016/0300547 A1* | 10/2016 | El-Rukby | H02J 50/80 |
| 2017/0005531 A1 | 1/2017 | Zeine et al. | |

* cited by examiner

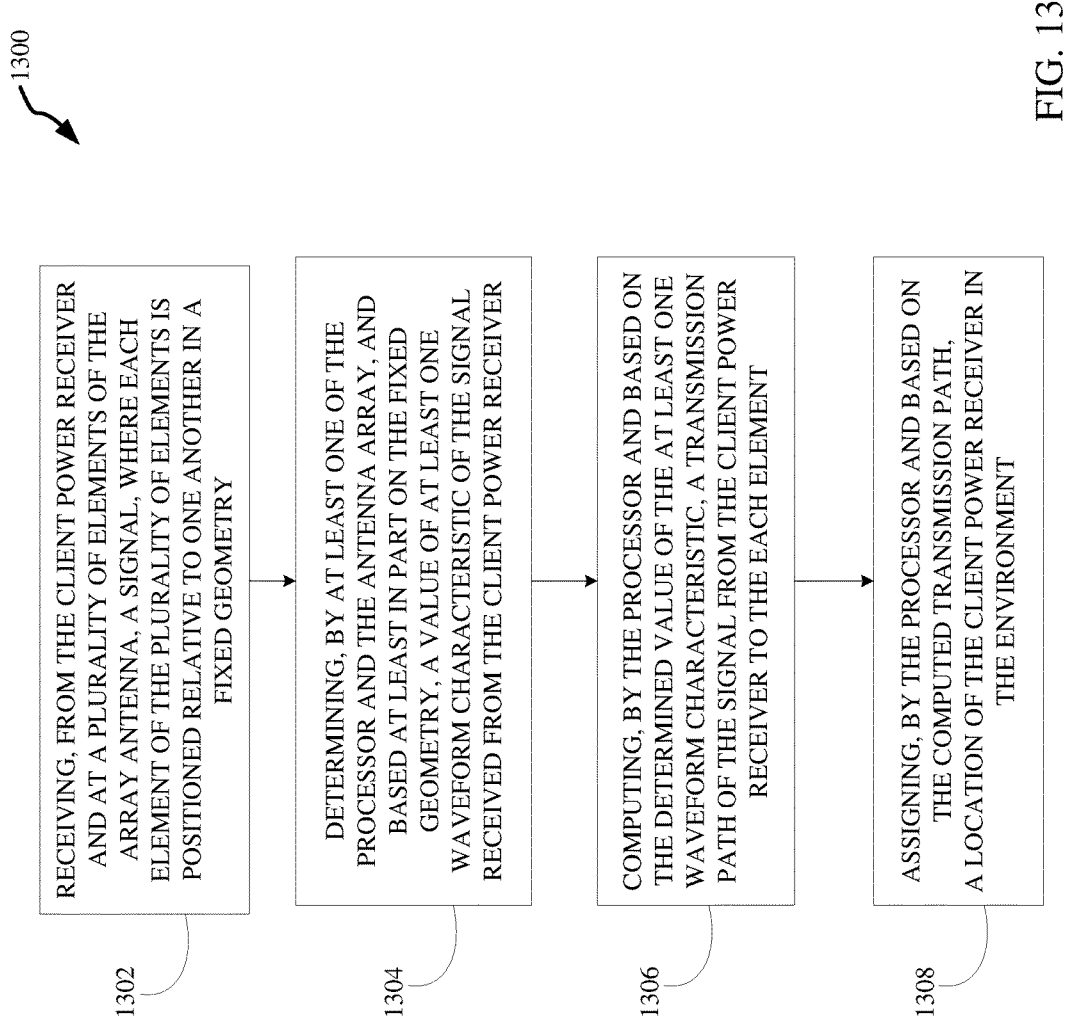

BEACON LOCALIZATION FOR A CLIENT DEVICE IN WIRELESS ENVIRONMENT APPLICATIONS

BACKGROUND

Wireless communication and power transmission systems require functionality of both transmitters and receivers for continuous operation. In such systems, under some circumstances, signal transmitting (Tx) and receiving (Rx) may be required or enhanced through determining a location of Tx and Rx components in a wireless environment. Precisely locating components in the environment and determining signal transmission paths therein is a prerequisite to providing Tx radiation patterns targeting Rx devices for efficient data communication and/or wireless power delivery. Further, in such systems, accurate location determinations of Tx and/or Rx devices in a dynamic environment including readily movable line-of-sight (LOS) obstructions is necessary to ensure effective and uninterrupted service.

Accordingly, a need exists for technology that overcomes the problem demonstrated above, as well as one that provides additional benefits. The examples provided herein of some prior or related systems and their associated limitations are intended to be illustrative and not exclusive. Other limitations of existing or prior systems will become apparent to those of skill in the art upon reading the following Detailed Description.

BRIEF DESCRIPTION OF THE DRAWINGS

One or more embodiments of the present invention are illustrated by way of example and not limitation in the figures of the accompanying drawings, in which like references indicate similar elements.

FIG. 13 is a flow diagram illustrating an example transceiver system operation method implemented by the transceiver system shown in FIG. 9 in accordance with an embodiment.

SUMMARY

Figure 1:
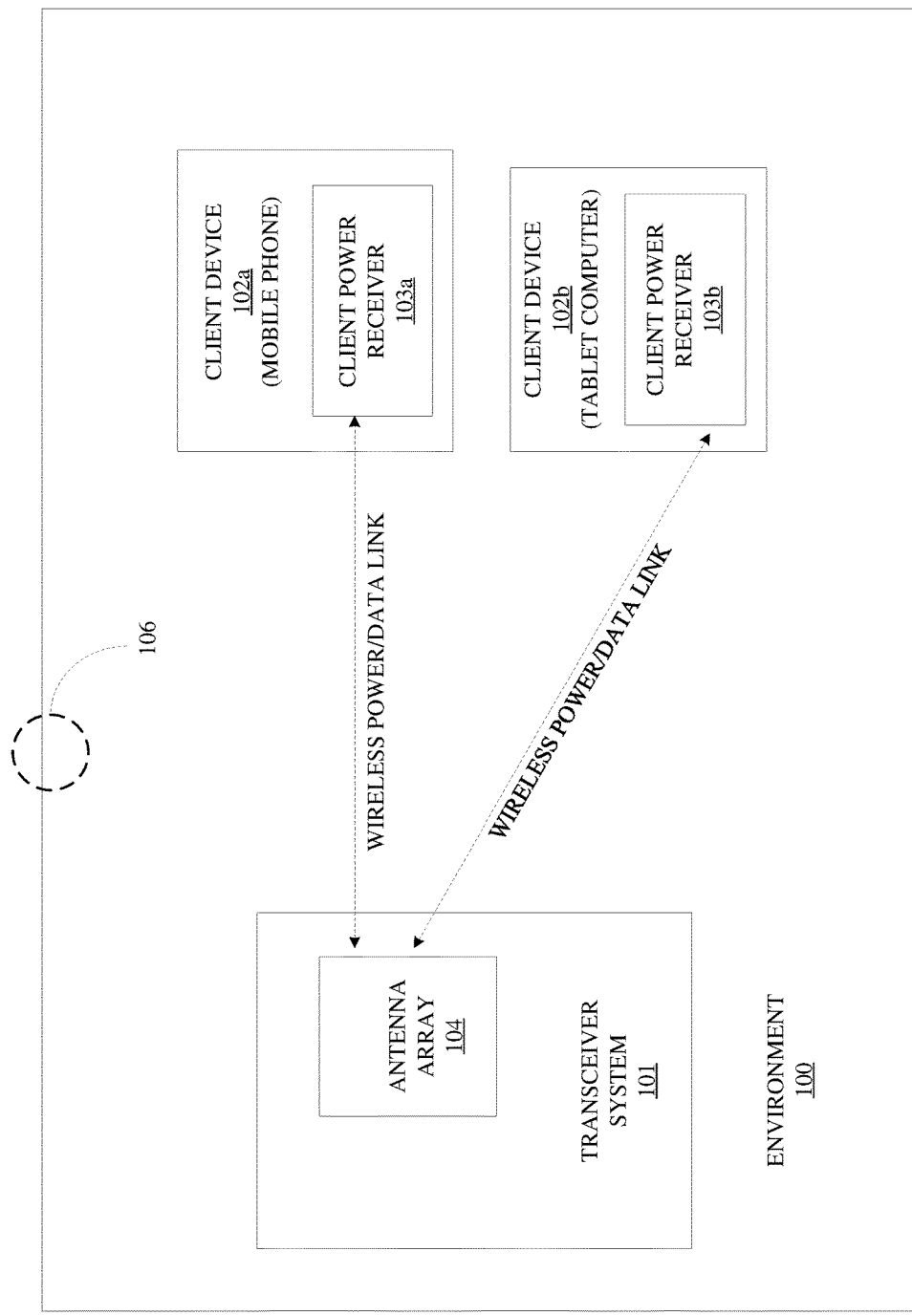
FIG. 1 is a diagram illustrating an example wireless communication and power delivery environment depicting wireless power delivery and data communication from one or more wireless transceiver systems to various wireless client devices within the environment in accordance with an embodiment.

In one embodiment, a method of operating a transceiver system is provided. The transceiver system is wirelessly communicatively coupled to a client power receiver, and the transceiver system includes an antenna array, a processor, and a memory. The transceiver system and the client power receiver are positioned in an environment. The method includes receiving, from the client power receiver and at a plurality of elements of the antenna array, a signal, where each element of the plurality of elements is positioned relative to one another in a fixed geometry. The method also includes determining, by at least one of the processor and the antenna array, and based at least in part on the fixed geometry, a value of at least one waveform characteristic of the signal received at the each element. The method further includes computing, by the processor and based on the determined value of the at least one waveform characteristic, a transmission path of the signal from the client power receiver to the each element. The method also includes assigning, by the processor and based on the computed transmission path, a location of the client power receiver in the environment.

In other embodiments, the method also includes storing in the memory the determined value of the at least one waveform characteristic, monitoring, by the processor, a plurality of determined values of the at least one waveform characteristic determined multiple times over a period of time commencing when the client power receiver is initially positioned at a first location in the environment, and detecting, by the processor and based on the monitoring, a relocation of the client power receiver from the first location to a second location different from the first location.

In such other embodiments, the method of operating the transceiver system further includes storing in the memory the determined value of the at least one waveform characteristic. In such embodiments, computing a transmission path of the signal from the client power receiver to the each element includes computing and storing in the memory, and based on the stored value of the at least one waveform characteristic, a value of a range from the each element to the client power receiver. Also, in such embodiments, computing a transmission path of the signal from the client power receiver to the each element includes calculating and storing in the memory, and based on at least one of the stored value of the range and the stored value of the at least one waveform characteristic, a reciprocal vector direction from the each element to the client power receiver.

In still other embodiments of the method, no more than two elements in the fixed geometry are positioned in the environment equidistant from the client power receiver. In such embodiments, determining a value of at least one waveform characteristic of the signal includes determining and storing in the memory a value of an initial time of arrival (TOA) of the signal at the each element. Also, in such embodiments, computing a value of the range includes computing the value of the range based on the value of the initial TOA. In yet other embodiments, the method also includes determining and storing in the memory, by at least one of the processor and the antenna array, a radiation pattern based at least in part on the value of the range and the reciprocal vector direction. In such embodiments, the method further includes transmitting a signal from the antenna array to the client power receiver in accordance with the determined radiation pattern.

In some embodiments of the method, assigning a location of the client power receiver in the environment also includes calculating an intersection point. In such embodiments, the intersection point defines a location in the environment at which a plurality of line segments at least one of: intersect and meet, distal the antenna array proximate respective line segment endpoints, each line segment of the plurality of line segments drawn from and extending away from the antenna array in a direction substantially equal to the respective reciprocal vector direction. Also, in such other embodiments, a length between the each element and a respective line segment endpoint of the plurality of line segment endpoints is substantially equal to a respective computed range value.

In some other embodiments of the method, the environment includes a three-dimensional (3D) space. In such other embodiments, determining a value of at least one waveform characteristic of the signal received at the each element comprises determining a value of an angle of arrival (AOA) of the client power signal received at the each element. Also, in such embodiments, computing a transmission path of the signal from the client power receiver to the each element further comprises calculating, based on the determined AOA value, a reciprocal vector having x, y, and z direction components, where the each line segment is drawn from and extends away from the antenna array in a direction substantially equal to the reciprocal vector having x, y, and z direction components.

In yet other embodiments of the method, the environment includes a non-line-of-sight (NLOS) environment. In such other embodiments, the NLOS environment includes at least one reflective surface, where the transmission path includes the at least one reflective surface. Also, in such embodiments, the signal reflects from the at least one reflective surface after following a first part path between the client power receiver and the at least one reflective surface, and the signal further follows a second part path between the at least one reflective surface and the each element. In such other embodiments, computing a transmission path of the signal from the client power receiver to the each element also includes computing and storing in the memory a value of a first distance between the client power receiver and a respective at least a portion of the at least one reflective surface. Also, in such other embodiments, computing a transmission path of the signal from the client power receiver to the each element further includes computing and storing in the memory a value of a second distance between the each element and the respective at least a portion of the at least one reflective surface. Further, in such other embodiments, computing a transmission path of the signal from the client power receiver to the each element further includes computing and storing in the memory a value of a reflection angle between the first part path and the second part path.

In some other embodiments of the method, the first and second part paths and a line segment having the each element and the client power receiver as endpoints define a triangular plane. In such other embodiments, the line segment defines the range. Also, in such embodiments, computing a value of a range from the each element to the client power receiver includes calculating, using at least one of: one or more trigonometry identities and one or more triangle properties, the length of the line segment based on at least one of the value of the first distance, the value of the second distance, and the value of the reflection angle.

In another embodiment, a transceiver system is provided. The transceiver system is positioned in an environment with a client power receiver, and the transceiver system is wirelessly communicatively coupled to the client power receiver. The transceiver system includes an antenna array including a plurality of elements, where each element of the plurality of elements is positioned relative to one another in a fixed geometry. The system also includes a memory and a processor communicatively coupled to the memory and communicatively coupled to the antenna array. The processor is programmed to direct the each element to receive the signal from the client power receiver. The processor is also programmed to determine, based at least in part on the fixed geometry, a value of at least one waveform characteristic of the signal received at the each element. The processor is further programmed to compute, based on the determined value of the at least one waveform characteristic, a transmission path of the signal from the client power receiver to the each element. The processor is also programmed to assign, based on the computed transmission path, a location of the client power receiver in the environment.

In other embodiments, the system also includes a display device communicatively coupled to the processor. In such other embodiments, the display device displays to a user of the system the assigned location of the client power receiver in the environment.

In still other embodiments of the system, the processor is further programmed to store in the memory the determined value of the at least one waveform characteristic. In such other embodiments, the processor is also programmed to monitor a plurality of determined values of the at least one waveform characteristic determined multiple times over a period of time commencing when the client power receiver is initially positioned at a first location in the environment. Also, in such embodiments, the processor is further programmed to detect, based on the processor monitoring, a relocation of the client power receiver from the first location to a second location different from the first location.

In yet other embodiments of the system, the processor is also programmed to store in the memory the determined value of the at least one waveform characteristic. In such other embodiments, to compute the transmission path of the signal from the client power receiver to the each element, the processor is further programmed to compute and store in the memory, and based on the stored value of the at least one waveform characteristic, a value of a range from the each element to the client power receiver. Also, in such embodiments, to compute the transmission path of the signal from the client power receiver to the each element, the processor is further programmed to calculate and store in the memory, and based on at least one of the stored value of the range and the stored value of the at least one waveform characteristic, a reciprocal vector direction from the each element to the client power receiver.

In still other embodiments of the system, no more than two elements in the fixed geometry are positioned in the environment equidistant from the client power receiver. In such embodiments, to determine a value of at least one waveform characteristic of the signal, the processor is also programmed to determine and store in the memory a value of an initial TOA of the signal at the each element. Also, in such embodiments, to compute a value of the range, the processor is further programmed to compute the value of the range based on the value of the initial TOA. In yet other embodiments of the system, the processor is also programmed to determining an store in the memory, a radiation pattern based at least in part on the value of the range and the reciprocal vector direction. In such embodiments, the processor is further programmed to direct the antenna array to transmit a signal to the client power receiver in accordance with the determined radiation pattern.

In some embodiments of the system, to assign a location of the client power receiver in the environment, the processor is further programmed to calculate an intersection point. In such embodiments, the intersection point defines a location in the environment at which a plurality of line segments at least one of: intersect and meet, distal the antenna array proximate respective line segment endpoints, each line segment of the plurality of line segments drawn from and extending away from the antenna array in a direction substantially equal to the respective reciprocal vector direction. Also, in such other embodiments, a length between the each element and a respective line segment endpoint of the plurality of line segment endpoints is substantially equal to a respective computed range value.

In some other embodiments of the system, the environment includes a 3D space. In such other embodiments, to determine a value of at least one waveform characteristic of the signal received at the each element, the processor is also programmed to determine a value of an AOA of the client power signal received at the each element. Also, in such embodiments, to compute a transmission path of the signal from the client power receiver to the each element, the processor is further programmed to calculate, based on the determined AOA value, a reciprocal vector having x, y, and z direction components, where the each line segment is drawn from and extends away from the antenna array in a direction substantially equal to the reciprocal vector having x, y, and z direction components.

In yet other embodiments of the method, the environment includes an NLOS environment. In such other embodiments, the NLOS environment includes at least one reflective surface, where the transmission path includes the at least one reflective surface. Also, in such embodiments, the signal reflects from the at least one reflective surface after following a first part path between the client power receiver and the at least one reflective surface, and the signal further follows a second part path between the at least one reflective surface and the each element. In such other embodiments, to compute a transmission path of the signal from the client power receiver to the each element, the processor is also programmed to compute and store in the memory a value of a first distance between the client power receiver and a respective at least a portion of the at least one reflective surface. Also, in such other embodiments, to compute a transmission path of the signal from the client power receiver to the each element, the processor is further programmed to compute and store in the memory a value of a second distance between the each element and the respective at least a portion of the at least one reflective surface. Further, in such other embodiments, to compute a transmission path of the signal from the client power receiver to the each element, the processor is also programmed to compute and store in the memory a value of a reflection angle between the first part path and the second part path.

In some other embodiments of the method, the first and second part paths and a line segment having the each element and the client power receiver as endpoints define a triangular plane. In such other embodiments, the line segment defines the range. Also, in such embodiments, to compute the value of the range from the each element to the client power receiver, the processor is further programmed to calculate, using at least one of: one or more trigonometry identities and one or more triangle properties, the length of the line segment based on at least one of the value of the first distance, the value of the second distance, and the value of the reflection angle.

In a further embodiment, one or more non-transitory computer-readable media (CRM) are provided. The one or more CRM have stored thereon processor-executable program instructions. When executed by a processor of a transceiver system including an antenna array coupled to the processor, the program instructions cause the processor to direct each element of a plurality of elements of the antenna array to receive a signal from a client power receiver. When executed by the processor, the program instructions also cause the processor to determine, based at least in part on a fixed geometry at which the each element is positioned relative to one another in the antenna array, a value of at least one waveform characteristic of the signal received at the each element. When executed by the processor, the program instructions further cause the processor to compute, based on the determined value of the at least one waveform characteristic, a transmission path of the signal from the client power receiver to the each element. And, when executed by the processor, the program instructions further also cause the processor to assign, based on the computed transmission path, a location of the client power receiver in an environment in which the transceiver system and the client power receiver are positioned.

In other embodiments of the one or more CRM, the transceiver system also includes a display device communicatively coupled to the processor. In such other embodiments, the program instructions, when executed by the processor, further cause the processor to display, on the display device, to a user of the system the assigned location of the client power receiver in the environment.

In still other embodiments of the one or more CRM, the program instructions, when executed by the processor, further cause the processor to store in the memory the determined value of the at least one waveform characteristic. In such other embodiments, the program instructions, when executed by the processor, also cause the processor to monitor a plurality of determined values of the at least one waveform characteristic determined multiple times over a period of time commencing when the client power receiver is initially positioned at a first location in the environment. Also, in such embodiments, the program instructions, when executed by the processor, further cause the processor to detect, based on the processor monitoring, a relocation of the client power receiver from the first location to a second location different from the first location.

In yet other embodiments of the one or more CRM, the program instructions, when executed by the processor, further cause the processor to store in the memory the determined value of the at least one waveform characteristic. In such other embodiments, to facilitate computing the transmission path of the signal from the client power receiver to the each element, the program instructions, when executed by the processor, also cause the processor to compute and store in the memory, and based on the stored value of the at least one waveform characteristic, a value of a range from the each element to the client power receiver. Also, in such embodiments, to facilitate computing the transmission path of the signal from the client power receiver to the each element, the program instructions, when executed by the processor, further cause the processor to calculate and store in the memory, and based on at least one of the stored value of the range and the stored value of the at least one waveform characteristic, a reciprocal vector direction from the each element to the client power receiver.

In still other embodiments of the one or more CRM, no more than two elements in the fixed geometry are positioned in the environment equidistant from the client power receiver. In such embodiments, to facilitate determining a value of at least one waveform characteristic of the signal, the program instructions, when executed by the processor, also cause the processor to determine and store in the memory a value of an initial TOA of the signal at the each element. Also, in such embodiments, to facilitate computing a value of the range, the program instructions, when executed by the processor, further cause the processor to compute the value of the range based on the value of the initial TOA. In yet other embodiments of the system, the program instructions, when executed by the processor, also cause the processor to determine and store in the memory, a radiation pattern based at least in part on the value of the range and the reciprocal vector direction. In such embodiments, the program instructions, when executed by the processor, further cause the processor to direct the antenna array to transmit a signal to the client power receiver in accordance with the determined radiation pattern.

In some embodiments of the one or more CRM, to facilitate assigning a location of the client power receiver in the environment, the program instructions, when executed by the processor, also cause the processor to calculate an intersection point. In such embodiments, the intersection point defines a location in the environment at which a plurality of line segments at least one of: intersect and meet, distal the antenna array proximate respective line segment endpoints, each line segment of the plurality of line segments drawn from and extending away from the antenna array in a direction substantially equal to the respective reciprocal vector direction. Also, in such other embodiments, a length between the each element and a respective line segment endpoint of the plurality of line segment endpoints is substantially equal to a respective computed range value.

In some other embodiments of the one or more CRM, the environment includes a 3D space. In such other embodiments, to facilitate determining a value of at least one waveform characteristic of the signal received at the each element, the program instructions, when executed by the processor, also cause the processor to determine a value of an AOA of the client power signal received at the each element. Also, in such other embodiments, to facilitate computing a transmission path of the signal from the client power receiver to the each element, the program instructions, when executed by the processor, further cause the processor to calculate, based on the determined AOA value, a reciprocal vector having x, y, and z direction components, where the each line segment is drawn from and extends away from the antenna array in a direction substantially equal to the reciprocal vector having x, y, and z direction components.

In yet other embodiments of the one or more CRM, the environment includes an NLOS environment. In such other embodiments, the NLOS environment includes at least one reflective surface, where the transmission path includes the at least one reflective surface. Also, in such embodiments, the signal reflects from the at least one reflective surface after following a first part path between the client power receiver and the at least one reflective surface, and the signal further follows a second part path between the at least one reflective surface and the each element. In such other embodiments, to facilitate computing a transmission path of the signal from the client power receiver to the each element, the program instructions, when executed by the processor, also cause the processor to compute and store in the memory a value of a first distance between the client power receiver and a respective at least a portion of the at least one reflective surface. Also, in such other embodiments, to facilitate computing a transmission path of the signal from the client power receiver to the each element, the program instructions, when executed by the processor, further cause the processor to compute and store in the memory a value of a second distance between the each element and the respective at least a portion of the at least one reflective surface. Further, in such other embodiments, to facilitate computing a transmission path of the signal from the client power receiver to the each element, the program instructions, when executed by the processor, also cause the processor to compute and store in the memory a value of a reflection angle between the first part path and the second part path.

In some other embodiments of the one or more CRM, the first and second part paths and a line segment having the each element and the client power receiver as endpoints define a triangular plane. In such other embodiments, the line segment defines the range. Also, in such embodiments, to facilitate computing the value of the range from the each element to the client power receiver, the program instructions, when executed by the processor, further cause the processor to calculate, using at least one of: one or more trigonometry identities and one or more triangle properties, the length of the line segment based on at least one of the value of the first distance, the value of the second distance, and the value of the reflection angle.

DETAILED DESCRIPTION

Techniques are described herein for beacon localization of client devices in wireless environment applications. More specifically, embodiments of the present disclosure describe techniques for computing signal transmitting (Tx) and/or receiving (Rx) paths in the environment, and assigning locations of Tx and/or Rx devices based on the computed Tx and/or Rx paths. Additionally, the techniques describe methods and systems for determining and monitoring over time values of waveform characteristics for determining Tx and/or Rx device locations and detecting changes therein in environments including three dimensional (3D) spaces.

In some embodiments, the systems and methods described herein can determine Tx radiation patterns for efficient data communication and/or power delivery between devices. More specifically, the techniques include systems and methods for determining and assigning device locations and providing efficient Tx and/or Rx radiation patterns under either static or dynamic environment conditions including readily movable line-of-sight (LOS) obstructing objects which may, from time to time, be positioned between LOS transmission paths for respective Tx and Rx devices.

In some implementations, the disclosed technology has one or more benefits. One benefit to determining locations, signal Tx and/or Rx paths, and radiation patterns according to the methods and systems described herein is enhancing data communication and/or wireless power delivery in a wireless environment application. Another benefit is reducing service interruption and providing service using lower average power consumption for wireless environment applications, thereby reducing associated operational and maintenance costs. Other benefits will become apparent to those having ordinary skill in the art based on this disclosure.

The following description and drawings are illustrative and are not to be construed as limiting. Numerous specific details are described to provide a thorough understanding of the disclosure. However, in certain instances, well-known or conventional details are not described in order to avoid obscuring the description. References to "one" or "an" embodiment in the present disclosure can be, but are not necessarily, references to the same embodiment, and such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which can be exhibited by some embodiments and not by others. Similarly, various requirements are described which can be requirements for some embodiments but no other embodiments.

The terms used in this specification generally have their ordinary meanings in the art within the context of the disclosure and in the specific context where each term is used. Certain terms that are used to describe the disclosure are discussed below, or elsewhere in the specification, to provide additional guidance to the practitioner regarding the description of the disclosure. For convenience, certain terms can be highlighted (e.g., using italics and/or quotation marks). The use of highlighting has no influence on the scope and meaning of a term; the scope and meaning of a term is the same, in the same context, whether or not it is highlighted. It will be appreciated that the same thing can be said in more than one way.

Consequently, alternative language and synonyms can be used for any one or more of the terms discussed herein, and no special significance is meant when a term is elaborated upon herein. Synonyms for certain terms are provided. A recital of one or more synonyms does not exclude the use of other synonyms. The use of examples anywhere in this specification, including examples of any terms discussed herein, is illustrative only, and is not intended to further limit the scope and meaning of the disclosure or of any term. Likewise, the disclosure is not limited to various embodiments given in this specification.

Without intent to further limit the scope of the disclosure, examples of instruments, apparatus, methods, and their related results according to the embodiments of the present disclosure are given below. Note that titles or subtitles can be used in the examples for convenience of the reader, and in no way limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

Various implementations of the disclosed technology are described below. The following description provides specific details and an enabling description of these implementations.

FIG. 1 is a diagram illustrating an example wireless communication/power delivery environment 100 depicting wireless power delivery and data communication from one or more wireless transceiver systems 101 to various wireless client devices 102 within environment 100. In particular, FIG. 1 illustrates an example wireless communication and power delivery environment 100 in which wireless power and/or data can be delivered to available wireless client devices 102 having one or more client power receivers 103. The client power receivers 103 are integrated into respective client devices 102 and are configured to receive wireless power from the one or more transceiver systems 101. Within environment 100, the wireless delivery of power from transceiver system 101 to client power receivers 103 in client device 102 is also referred to herein as a wireless power transfer system (WPTS).

As shown in the example of FIG. 1, the wireless client devices 102 shown in FIG. 1 are mobile phone devices (e.g., client device 102a having a respective client power receiver 103a) and a tablet computer (e.g., client device 102b having a respective client power receiver 103b), although the client devices 102 can be any wireless device that needs power and is capable of receiving wireless power via one or more integrated client power receivers 103. The client devices 102 shown in FIG. 1 are enabled to communicate with transceiver systems 101 and other communication devices (e.g., Wi-Fi and cellular networks). Client devices 102 are further enabled to transmit beacon signals. Other client devices, not shown in FIG. 1, are not configured and enabled to communicate (e.g., no Bluetooth or Wi-Fi capability) and thus do not transmit beacon signals. As discussed herein, the one or more integrated client power receivers 103, or "wireless power receivers," receive and process power from the one or more transceiver systems 101 and provide the power to the client devices 102 for operation thereof.

Each transceiver system 101 includes an antenna array 104 having a plurality of antenna elements that are each capable of delivering wireless power to client devices 102. Each transceiver system 101 can also transmit (Tx) and receive (Rx) wireless data communication signals to and from client devices 102, respectively. In some embodiments, the data communication antennas can communicate via Bluetooth™, Wi-Fi, ZigBee™, or other wireless communication protocols such IEEE 802.15.4 or IEEE 802.11. Also, in some embodiments, the wireless power and wireless communication signals can be delivered as a combined power/communication signal. In still other embodiments, not shown in FIG. 1, transceiver system 101 includes an additional antenna and/or an antenna array separate from antenna array 104 that implements data communication, but not wireless power delivery. The transceiver system 101 is configured to determine the appropriate phases to transmit coherent power signals to the client power receivers 103 as part of the WPTS. Antenna array 104 thus transmits a signal (e.g., a continuous wave or a pulsed power transmission signal) from each of the plurality of antenna elements at a specific phase relative to each other. Further, it is to be understood that use of the term "array" does not necessarily limit the antenna array 104 to any specific array structure. That is, the antenna array 104 need not be structured in a specific "array" form or geometry. Furthermore, as used herein, the term "array" or "array system" can be used to include related and peripheral circuitry for signal generation, reception, and transmission, such as in radios, digital logic, and modems.

Each client power receivers 103 includes one or more antennas (not shown) for receiving signals from the transceiver systems 101. Antenna array 104 is capable of emitting continuous wave signals at specific phases relative to each other. As discussed above, using antenna array 104 as a primary input device, transceiver system 101 is capable of determining the appropriate phases for delivering coherent signals to the client power receivers 103. For example, coherent signals can be determined by computing the complex conjugate of a received beacon and/or other signal at each antenna element of antenna array 104 such that the coherent signal is properly phased for the particular client power receiver 103 that transmitted the beacon or other signal. The beacon signal and other signals described and illustrated, are primarily referred to herein as continuous waveforms, but alternatively or additionally take the form of modulated signal waveforms.

Although not illustrated in FIG. 1, each of the above listed components of the environment 100 (e.g., client power receivers 103, transceiver system 101, etc.) can include control and synchronization mechanisms, such as a data communication synchronization module. The transceiver systems 101 are connected to a power source such as, for example, a power outlet or source connecting the transmitters to a standard or primary alternating current (AC) power supply in a building. Alternatively, or additionally, one or more of the transceiver systems 101 can be powered by a battery or via another power-providing mechanism.

In some embodiments, the client power receivers 103 and/or the transceiver systems 101 utilize or encounter reflective surfaces 106 such as, for example, walls or other RF reflective obstructions within range to beacon and deliver and/or receive wireless power and/or data within wireless communication and power delivery environment 100. One or more of the reflective surfaces 106 can be utilized for multi-directional signal communication regardless of whether a blocking object is in the line of sight between transceiver system 101 and client power receiver 103.

As described herein, each client device 102 can be any system and/or device, and/or any combination of devices/systems that can establish a communication connection (e.g., session) with another device, a server and/or other systems within the example environment 100. In some embodiments, the client devices 102 include displays or other output functionalities to present data to a user and/or input functionalities to receive data from the user. By way of example, a client device 102 can be, but is not limited to, a video game controller, a server desktop, a desktop computer, a computer cluster, or a mobile computing device (such as a notebook, a laptop computer, a handheld or tablet computer, a mobile phone, a smart phone, a battery or component coupled to a battery, a PDA, etc.). The client device 102 can also be any wearable device such as watches, necklaces, rings, or even devices (e.g., medical or veterinary devices) implanted within a human or animal patient. Other examples of a client device 102 include, but are not limited to, safety sensors (e.g., fire or carbon monoxide), electric toothbrushes, electronic door locks/handles, electric light switch controllers, electric shavers, etc.

Although not illustrated in the example of FIG. 1, the transceiver system 101 and the client power receivers 103 can each include a data communication module for communication via a data channel. Alternatively, or additionally, the client power receivers 103 can direct the client devices 102 to communicate with the transceiver system 101 via existing data communications modules.

Figure 2:
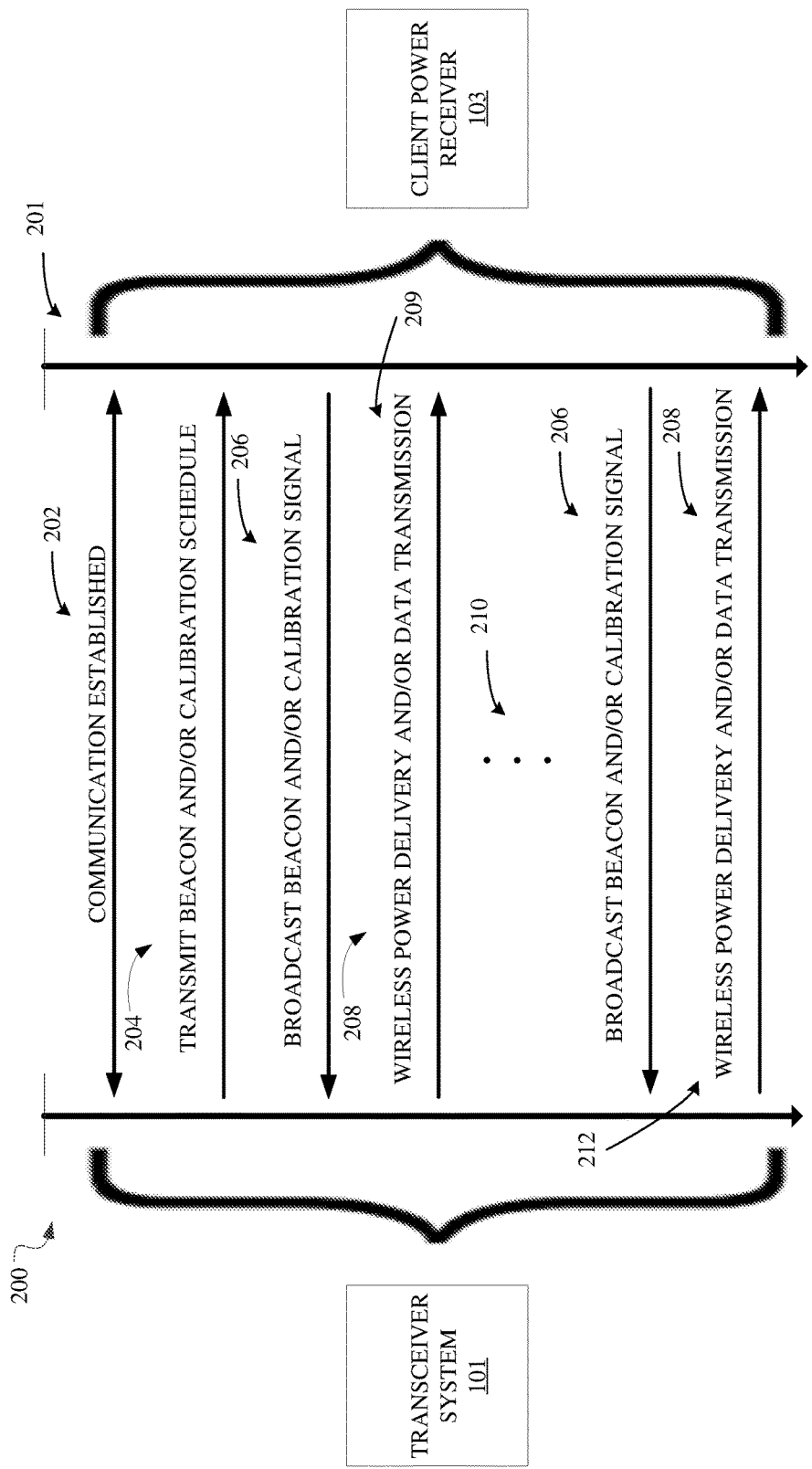
FIG. 2 is a sequence diagram illustrating example operations between the transceiver system and the client power receiver for commencing wireless power delivery and/or wireless data communication in accordance with an embodiment.

FIG. 2 is a sequence diagram 200 illustrating example operations (e.g., operations 202-208) between the transceiver system 101 and the client power receiver 103 for commencing wireless power delivery and/or wireless data communication, according to an embodiment. In FIG. 2, downwardly-facing arrows proximate transceiver system 101 and client power receiver 103 represent the passage of time and the ordering of operations in sequence diagram 200. Thus, in an operation 202 at an initial time point 201, communication is established between the transceiver system 101 and the client power receiver 103, such as communication via Bluetooth™ Wi-Fi, ZigBee™, or other wireless communication protocols. In an operation 204 after communication is established, transceiver system 101 transmits a beaconing schedule to the client power receiver 103 to arrange beacon broadcasting and RF power/data communication schedules with client power receiver 103. Also, in operation 204, transceiver system 101 transmits a calibration schedule to client power receiver 103 after communication is established.

In an operation 208 and in response to receiving the beaconing schedule and/or calibration schedule, the client power receiver 103 broadcasts the beacon and/or a calibration signal. The beacon received by antenna array 104 (not shown) of transceiver system 101 is used by transceiver system 101 to determine the phase (or direction) at which the beacon signal was received, as further shown and described below. The transceiver system 101 then delivers wireless power and/or transmits data to the client power receiver 103 based on the phase (or direction) of the received beacon. That is, the transceiver system 101 determines the complex conjugate of the phase and uses the complex conjugate to deliver power to the client power receiver 103 in the same direction in which the beacon signal was received from the client power receiver 103.

The above described operations 206 and 208 may be repeated at any time after a first instance 209 of operation 208. If needed, operations 202 and/or 204 are also repeated after the first instance 209 of operation 208. Operations 206 and 208, and optionally operations 202 and/or 204, are repeated in response to an event occurring as determined by at least one of the transceiver system 101 and the client power receiver 103. If, for example, and without limitation, at a subsequent time point 210 after the first instance 209 of operation 208, client power receiver 103 is relocated from a first position in wireless communication and power delivery environment 100 (shown in FIG. 1) to a second position therein, such a motion event is determined by at least one of the transceiver system 101 and the client power receiver 103. The motion event prompts the repetition of operations 206 and 208, and, if needed, operations 202 and/or 204. On the other hand, if, at subsequent time point 210, such a motion event is not determined by transceiver system 101 and/or client power receiver 103, neither operations 206 and 208, nor operations 202 and/or 204 require repetition. Similarly, if, after a second instance 212 of operation 208, client power receiver 103 is relocated from the first position in environment 100 to a second position therein, transceiver system 101 and/or client power receiver 103 determines this to be a subsequent motion event and operations 206 and 208, and, if needed, operations 202 and/or 204 are again repeated in sequence diagram 200.

The transceiver system 101 can determine the different phases of the beacon signal received at each antenna element of antenna array 104. Transceiver system 101 can then utilize the algorithm or process described in one or more of U.S. Pat. Nos. 8,558,661, 8,159,364, 8,410,953, 8,446,248, and 8,854,176, U.S. patent application Ser. Nos. 14/461,332 and 14/815,893, and U.S. Provisional Patent Application Nos. 62/146,233 and 62/163,964, which are incorporated herein by reference in their entireties for all purposes. Taking into account the determined phases and the geometry of relative positions of each antenna element of the plurality of antenna elements in antenna array 104, transceiver system 101 determines how to emit signals from one or more antenna elements in such a way as to create an aggregate signal from the transceiver system 101 that approximately recreates the waveform and radiation pattern of the beacon, but in the opposite (e.g., reciprocal) direction.

Figure 3:
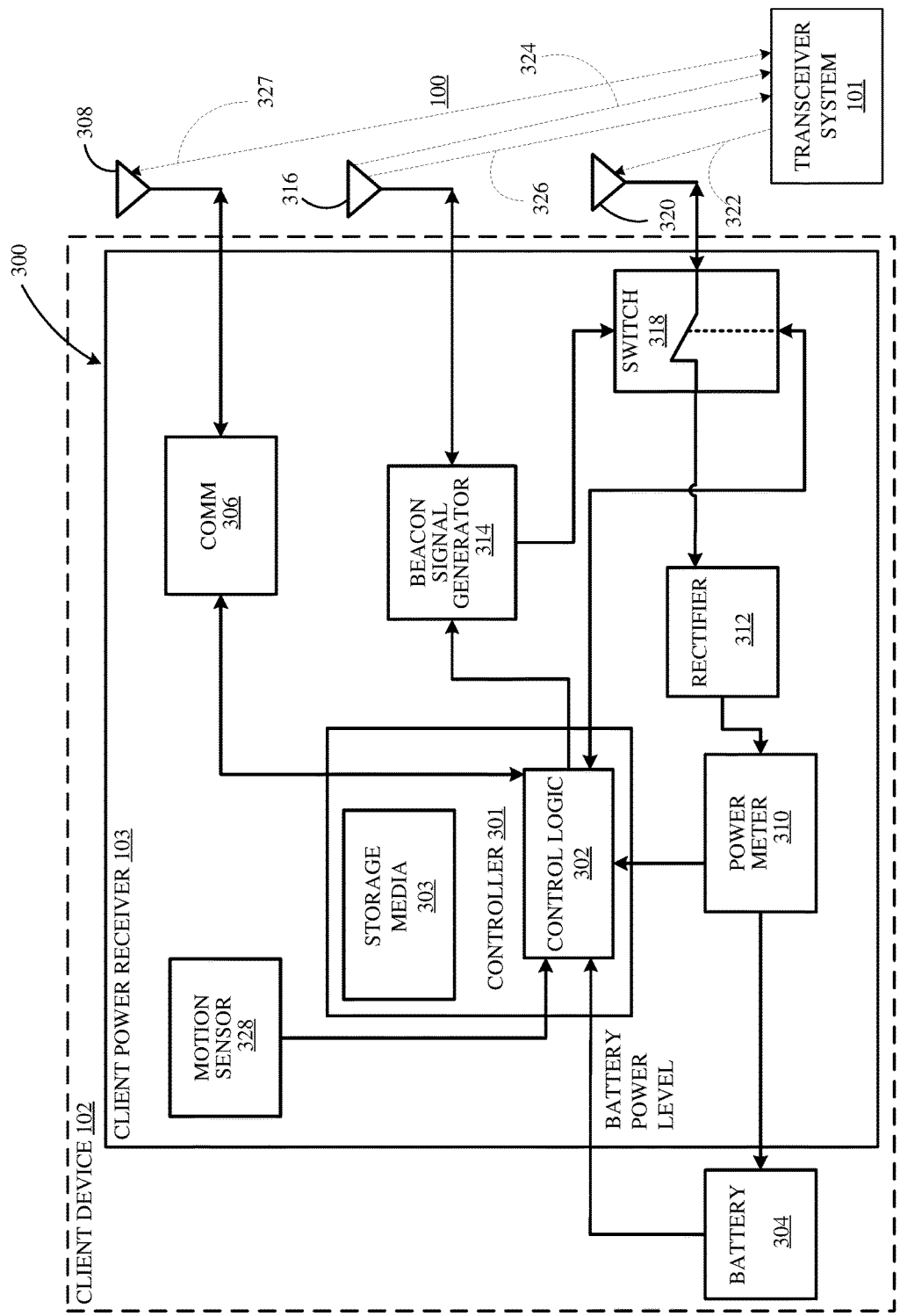
FIG. 3 is a block diagram illustrating an example client power receiver in accordance with an embodiment.

FIG. 3 is a block diagram illustrating an example client power receiver 300 in accordance with an embodiment (e.g., client power receiver 103 shown in FIGS. 1 and 2). The client power receiver 103 includes various functional components such as analog and digital electronic devices that are at least one of electrically and communicatively coupled together. The functional components of client power receiver 103 include a controller 301 having control logic 302 and data storage media 303. Client power receiver 103 also includes a battery 304, a communication block 306 and an associated first antenna 308, a power meter 310, a rectifier 312, a beacon signal generator 314 and an associated second antenna 316, and a switch 318 alternately coupling the rectifier 312 and the beacon signal generator 314 to an associated third antenna 320. Some or all of the above listed components of client power receiver 103 can be omitted in some embodiments. Additional or fewer components are also possible.

The rectifier 312 receives (e.g., via the third antenna 320) a power transmission signal 322 from the transceiver system 101, which is fed through the power meter 310 to the battery 304 for charging. The power meter 310 measures the total received power signal strength and provides the control logic 302 with this measurement. The control logic 302 also can receive the battery power level from the battery 304 itself or receive battery power data from, for example, an application programming interface (API) of an operating system running on the client power receiver 103. The control logic 302 can also transmit/receive, via the communication block 306, a data signal on a data carrier frequency, such as the base signal clock for clock synchronization.

Using the second 316 and/or third 320 antennas, the beacon signal generator 314 transmits a beacon signal 324 or a calibration signal 326 to transceiver system 101. Furthermore, in the example embodiment, battery 304, and the first 308, second 316, and third 320 antennas are positioned in the client device 102. In other embodiments, at least one of the battery 304, first 308, second 316, and third 320 antennas are positioned in the client power receiver 103. For example, and without limitation, an embodiment of client power receiver 103, not shown in FIG. 3, includes a dedicated power supply such as a battery cell that may or may not be rechargeable through rectifier 312 and/or a plug-in charger circuit of the client device 102. Thus, in such other embodiments, during such times when client device 102 is powered off, client power receiver 103 may remain fully capable of using the second 316 and/or third 320 antennas to transmit beacon signal 324 and/or calibration signal 326, as well as receive power transmission signal 322, for purposes of client device 102 localization and/or WPTS-based battery 304 charging. At least one of the first 308, second 316, and third 320 antennas also enable client power receiver 103 to Tx/Rx a data signal 327 to/from transceiver system 101.

Although the battery 304 shown in FIG. 3 is charged via WPTS through the circuit including rectifier 312, the client power receiver 103 can also receive its supply power directly from the rectifier 312 instead of, or in addition to client power receiver 103 being powered by battery 304. Moreover, battery 304 is also the main power supply for client device 102 in the example embodiment, but is shown as included in the client power receiver 103 because of the integrated design characteristics of client power receiver 103 in client device 102. Also, it can be noted that the use of multiple antennas (e.g., antennas 308, 316, and 320) is one example of implementation of client power receiver 103 and the structure can be reduced to one shared antenna, where the client power receiver 103 multiplexes signal reception and transmission.

Client power receiver 103 also includes a motion sensor 328 capable of detecting motion and signaling the control logic 302 of a motion event of client power receiver 103. For example, when client power receiver 103 is receiving power at high frequencies (e.g., above 500 MHz), its location can become a sink for incoming radiation. When a client power receiver 103 is in such an operational state and is on a person, the level of radiation can exceed an acceptable radiation levels set by regulatory authorities. To avoid potential over-radiation issues, client power receiver 103 can integrate additional motion detection mechanisms (not shown in FIG. 3) such as accelerometers, assisted global positioning system (GPS), or other mechanisms. Once motion sensor 328 determines the motion event, control logic 302 assumes that the motion event equates to the client power receiver 103 being handled by a user (not shown in FIG. 3) of client device 102. Control logic 302 then signals the transceiver system 101 either to stop transmitting power to it, or to lower a transmitted power to an acceptable fractional level. In cases where the client power receiver 103 is used in a moving environment like a transceiver system 101-equipped vehicle (not shown in FIG. 3), power may be transmitted intermittently or at a reduced level unless the device is close to losing all available power. Motion sensor 328, as well as the aforementioned additional motion detection mechanisms, may be integrated into client device 102 instead of or in addition to, and for the same functional effect and benefit as, being integrated into client power receiver 103.

Figure 4:
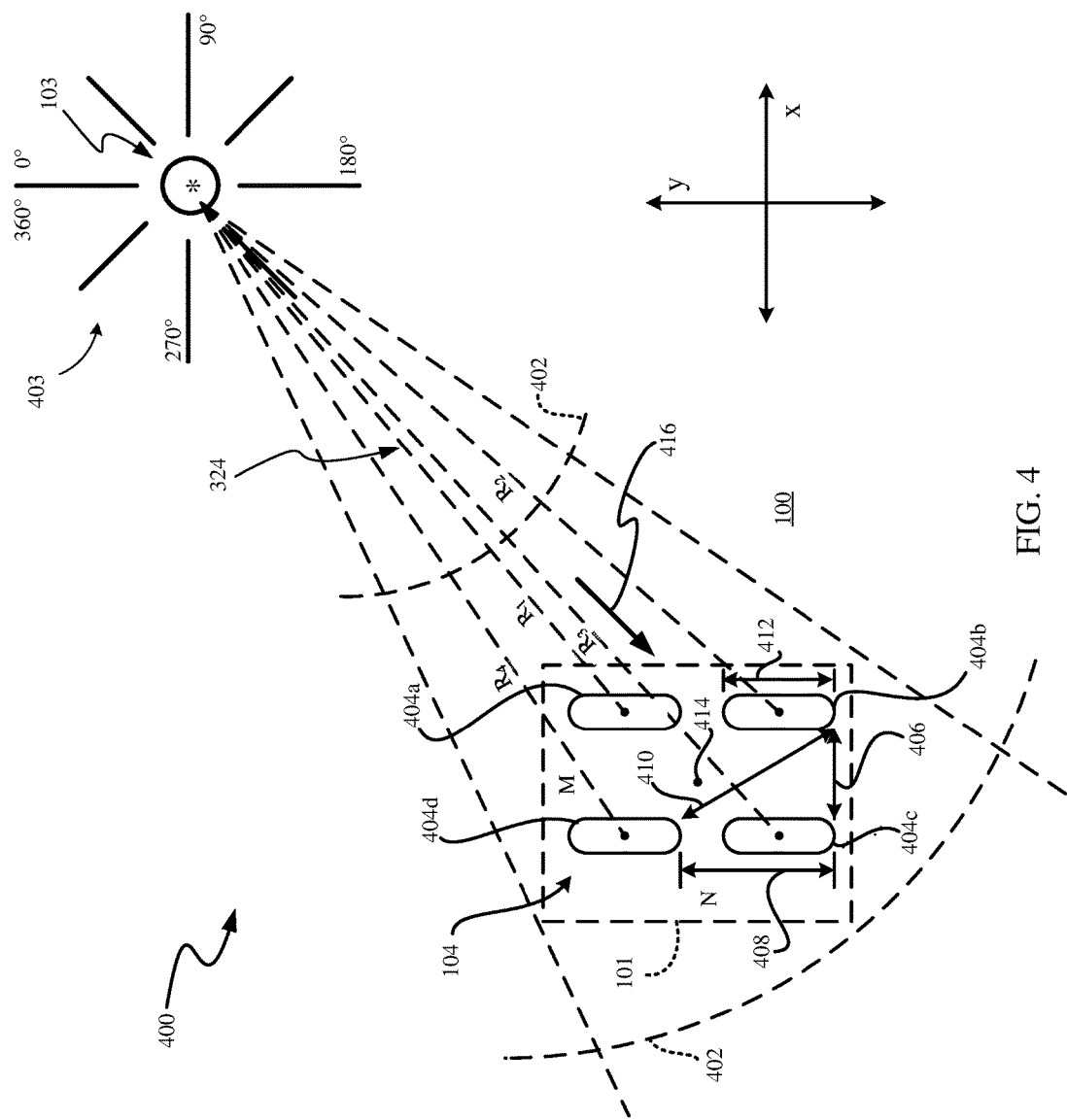
FIG. 4 is a diagram illustrating an example wireless communication and power delivery environment in accordance with an embodiment.

FIG. 4 is a diagram illustrating an example wireless communication and power delivery environment 400 in accordance with an embodiment (e.g., environment 100 shown in FIGS. 1 and 3). In particular, FIG. 4 illustrates environment 100 in which client power receiver 103 transmits (e.g., via second antenna 316, not shown in FIG. 4) beacon signal 324 as substantially spheroid wavefronts 402 propagating through a transmission medium (e.g., air) in all or a subset of azimuthal directions 403 (e.g., 0° (zero degrees) to 360°). The azimuthal directions are defined relative to a plane defined by the antenna array 104. Antenna array 104 of transceiver system 101 is positioned at a fixed location in environment 100 in line-of-sight (LOS) of client power receiver 103. Antenna array 104 is capable of receiving beacon signal 324 from all or a subset of the azimuthal directions 403. In the example embodiment, antenna array 104 is positioned at a fixed location in environment 100 in line-of-sight (LOS) of client power receiver 103. Also, in the example embodiment shown in FIG. 4, antenna array 104 includes a plurality of antenna elements 404 arranged and spaced apart in an M×N arrangement.

Also, in the exemplary embodiment, antenna array 104 includes an even number of antenna elements 404, specifically four antenna elements 404 (a first element 404*a*, a second element 404*b*, a third element 404*c*, and a fourth element 404*c*), where M=N=2. First 404*a* and fourth 404*d* elements and second 404*b* and third 404*c* elements are spaced apart by a substantially equal M element spacing distance 406. First 404*a* and second 404*b* elements and third 404*c* and fourth 404*d* elements are spaced apart by a substantially equal N element spacing distance 408. First 404*a* and third 404*c* elements and second 404*b* and fourth 404*d* elements are spaced apart by a substantially equal diagonal element spacing distance 410. Further, in the example embodiment, all antenna elements 404 of antenna array 104 have substantially equivalent element heights 412 (e.g., either a positive or negative height with respect to an element supportive member, not shown, of antenna array 104). Thus, antenna array 104 of the fixed transceiver system 101 has a fixed and substantially symmetric geometry (e.g., with respect to a center point 414) for the plurality of antenna elements 404 which is known to and utilized by transceiver system 101 in performing the various algorithms, methods, and processes described herein. In other embodiments, not shown, the geometry of the plurality of elements 404 in antenna array 104 is not symmetric and at least one element 404 has at least one structural dimension that is not substantially equal to the at least one structural dimension of one or more other elements 404 of the plurality of antenna elements 404. In still other embodiments, not shown, antenna array 104 includes an odd number of elements 404.

Beacon signal 324 is received at each antenna element 404 of antenna array 104 at respective incidence azimuthal directions 403, each of which average to an average beacon incidence azimuthal direction 403 (e.g., an incidence vector 416 having x and y components) drawn from client power receiver 103 to center point 414. In the example shown in FIG. 1, incidence azimuthal directions 403 for beacon signal 324 range from about 202° (at fourth element 404*d*) to about 248° (at second element 404*b*), and the average beacon incidence azimuthal direction 403 of incidence vector 416 is about 225°.

Figure 5:
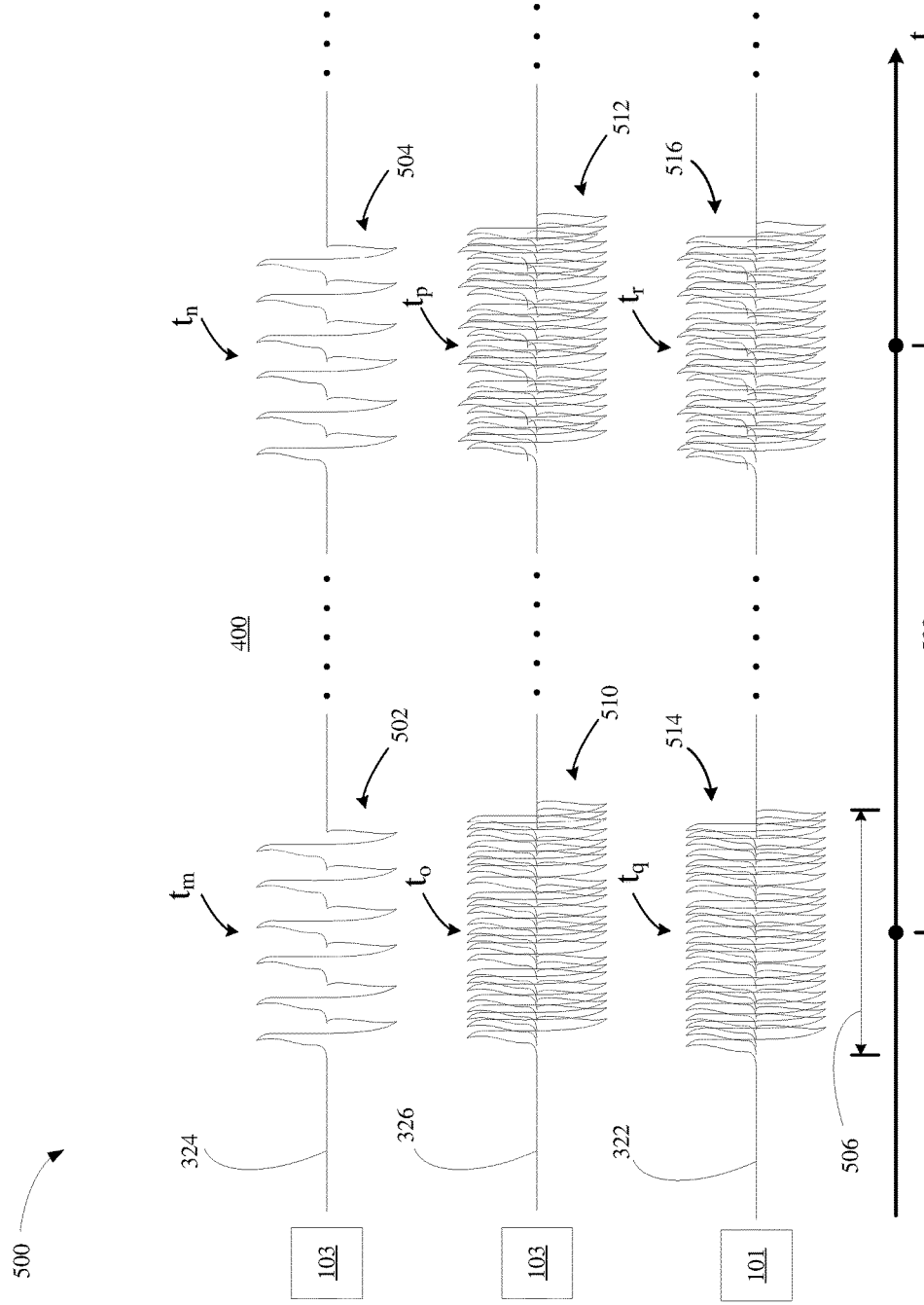
FIG. 5 is a diagram illustrating an example signal process for transmission of a beacon signal and a calibration signal from the client power receiver to the transceiver system in accordance with an embodiment.

FIG. 5 is a diagram illustrating an example signal process 500 for transmission of beacon signal 324 and calibration signal 326 from client power receiver 103 to transceiver system 101 (both shown in FIGS. 1 and 2, but not in FIG. 5) in accordance with an embodiment. In the example embodiment, beacon signal 324 and calibration signal 326 are substantially sinusoidal signals which may be encoded using, for example and without limitation, amplitude shift keying (ASK) and frequency shift keying (FSK), to enable transceiver system 101 (not shown in FIG. 5) to, for example, uniquely identify respective client power receiver 103 from among a plurality of client power receivers 103 from which beacon 324 and/or calibration 326 signals originate. Also, in the example embodiment, beacon signal 324 is transmitted by client power receiver 103 at a lower frequency than a frequency at which calibration signal 326 is transmitted.

According to the beaconing schedule received from transceiver system 101 (e.g., operation 204 described above with respect to FIG. 2), client power receiver transmits beacon signal 324 as one or more beacon bursts. For example, in the example embodiment, a first beacon burst 502 centered at a first time ($t_m$) is followed by a second beacon burst 504 centered at a second time ($t_n$), with $t_m$ and $t_n$ separated by an inter-burst period 508. In some embodiments, the value a burst time 506, the inter-burst period 508, and a number of beacon bursts to be transmitted is based on the beaconing schedule. In other embodiments, such beacon signal 324 transmission parameters are based on settings stored in the storage media 303 (not shown in FIG. 5) of client power receiver 103 controller 301 (also not shown in FIG. 5). In still other embodiments, not shown, a plurality of first beacon bursts 502 are transmitted over a first time period and a plurality of second beacon bursts 504 are transmitted over a second time period commencing after the first time period ceases. In such other embodiments, a duration of the first time period and/or the second time period, as well as a duration of time between the cessation of the first time period and the start of second time period are based on the beaconing schedule and/or the settings stored in the storage media 303.

Similarly, in the example embodiment, a first calibration signal burst 510 centered at a third time ($t_o$) is followed by a second calibration signal burst 512 centered at a fourth time ($t_p$), with $t_o$ and $t_p$ separated by inter-burst period 508. In some embodiments, the value a burst time 506 and inter-burst period 508 for calibration signal bursts, and a number thereof to be transmitted is based on the calibration schedule. In other embodiments, such calibration signal 326 transmission parameters are based on settings stored in the storage media 303. In still other embodiments, not shown, a plurality of first calibration signal bursts 510 are transmitted over a third time period and a plurality of second calibration signal bursts 512 are transmitted over a fourth time period commencing after the third time period ceases. In such other embodiments, a duration of the third time period and/or the fourth time period, as well as a duration of time between the cessation of the third time period and the start of fourth time period are based on the calibration schedule and/or the settings stored in the storage media 303.

Likewise, in the example embodiment, a first power transmission burst 514 centered at a fifth time ($t_q$) is followed by a second power transmission burst 516 centered at a sixth time ($t_r$), with $t_q$ and $t_r$ separated by inter-burst period 508. In some embodiments, the value a burst time 506 and inter-burst period 508 for power transmission bursts, and a number thereof to be transmitted by transceiver system 101 is based on a power delivery schedule determined by transceiver device 101. In other embodiments, such power transmission signal 322 transmission parameters are based on settings stored in the storage media 303. In still other embodiments, not shown, a plurality of first power transmission bursts 514 are transmitted over a fifth time period and a plurality of second power bursts 516 are transmitted over a sixth time period commencing after the fifth time period ceases. In such other embodiments, a duration of the fifth time period and/or the sixth time period, as well as a duration of time between the cessation of the fifth time period and the start of sixth time period are based on the power delivery schedule and/or the settings stored in the storage media 303.

Figure 6:
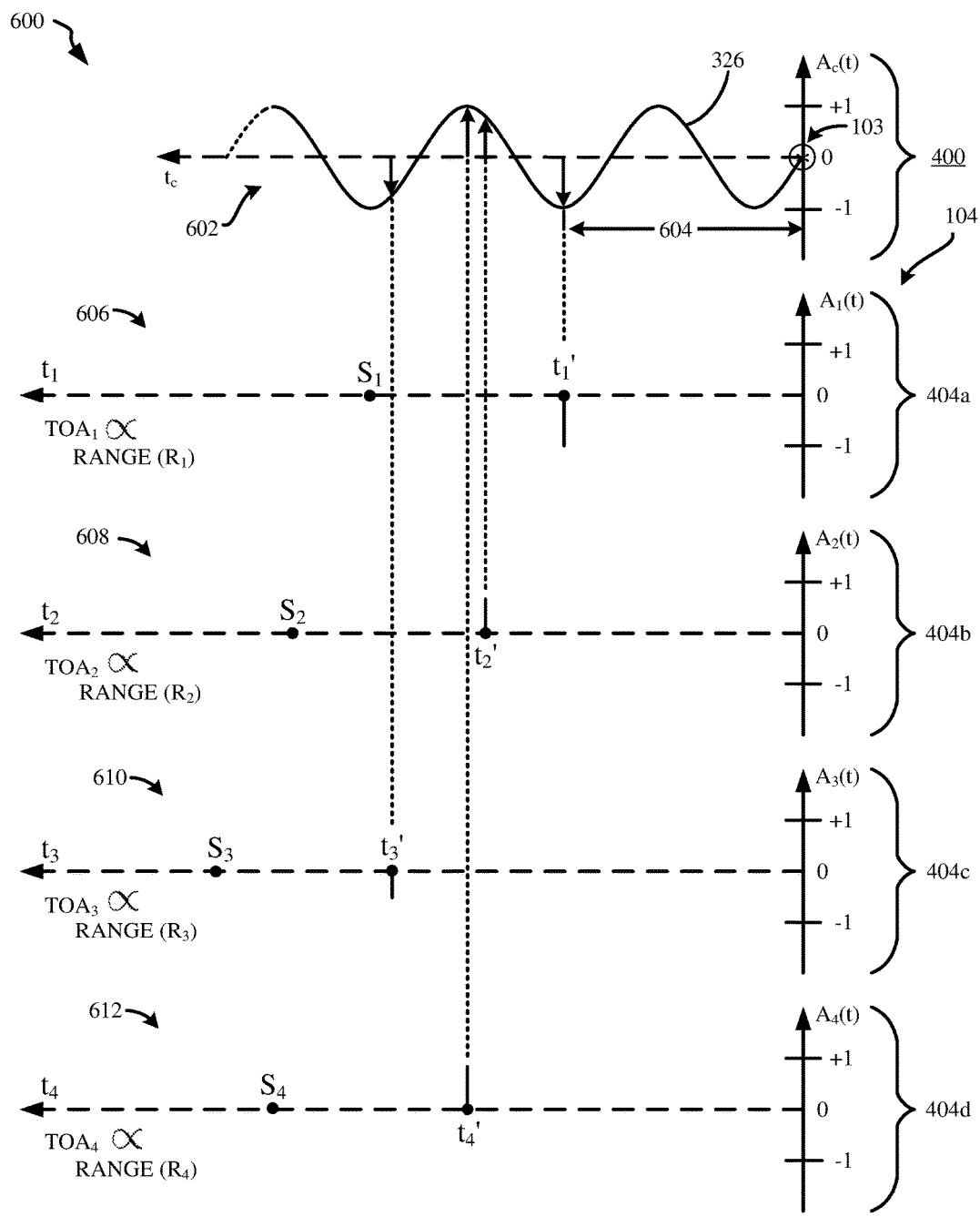
FIG. 6 is a diagram illustrating an example signal detection process for receipt of the calibration signal by the transceiver system from the client power receiver in accordance with an embodiment.

FIG. 6 is a diagram illustrating an example signal detection process 600 for receipt of calibration signal 326 by transceiver system 101 from client power receiver 103 in accordance with an embodiment. In the example embodiment, client power receiver 103 transmits calibration signal 326 over time ($t_c$) from a particular location of client device 102 in environment 400. Being a substantially sinusoidal electromagnetic plane waveform, calibration signal 326 has an electric-field component (E) that is orthogonal is to a magnetic-field component (H). Therefore, it is assumed that, over any number of consecutively sampled time points, an amplitude of E varies directly proportionally with an amplitude of H, and zero crossing points occur at substantially equivalent times, and thus calibration signal 326 is depicted as a single waveform in FIG. 6.

Calibration signal 326 is depicted in FIG. 6 as a waveform amplitude $A_c(t)$ versus time ($t_c$) plot 602, with $A_c(t)$ ranging between arbitrarily assigned values of 1 and −1, and with a waveform period 604 based on the frequency. FIG. 6 also includes plots 606-612 depicting response amplitudes, $A_1(t)$, $A_2(t)$, $A_3(t)$, and $A_4(t)$, versus times ($t_1$, $t_2$, $t_3$, and $t_4$) for each of the four antenna elements (404a-404d) of antenna array 104, with respective response amplitudes ranging between arbitrarily assigned values of 1 and −1. Response amplitudes $A_1(t)$, $A_2(t)$, $A_3(t)$, and $A_4(t)$ are denoted by line segments perpendicular to time axes $t_1$, $t_2$, $t_3$, and $t_4$ in plot 606-612, with the lengths of the line segment lengths being substantially equal to the lengths of the arrows in plot 602. Referring to FIG. 4, antenna array 104 is in a fixed position of environment 400 and has four substantially symmetrically-spaced antenna elements (404a-404d). Thus, as shown and described above with reference to FIG. 4 for beacon signal 324, after initiation of signal transmission by client power receiver 103 at t=0, calibration signal 326 is first detected by each of the four antenna elements 404 of antenna array 104 at four different subsequent time after t=0. This is because each of the four antenna elements 404 are positioned at different distances from client power receiver 103 (treated as a point source, denoted "*" in FIGS. 4 and 6).

Also, in the example embodiment, due to the different distances (e.g., ranges from and/or elevations above or below) of each antenna element 404 from client power receiver 103, each instantaneous time point after t=0 corresponds to a different instantaneous $A_c(t)$ of the calibration signal 326 waveform (denoted by arrows perpendicular to the $t_c$ axis in plot 602). For example, first element 404a initially receives calibration signal 326 at $t_4'$ second element 404b initially receives calibration signal 326 at $t_2'$, third element 404c initially receives calibration signal 326 at $t_3'$, and fourth element 404d initially receives calibration signal 326 at $t_4'$. Also owing to the varying distances of each of the four antenna elements 404 from client power receiver 103 center point 414, $t_1' \neq 2' \neq 3' \neq 4'$. Assuming that $A_1(t)$ is directly proportional to $A_c(t)$ for all points $t_c$ and $t_1$, $A_1(t)$ is substantially equal to −1 at $t_1$ just as $A_c(t)$ is substantially equal to −1 at $t_1'$. Likewise, $A_2(t)$ and $A_c(t)$ are substantially equal to 0.7 at $t_2'$, $A_3(t)$ and $A_c(t)$ are substantially equal to −0.5 at $t_3'$, and $A_4(t)$ and $A_c(t)$ are substantially equal to 0.9 at $t_4'$.

Further, given the example antenna array 104 geometry and the antenna array 104 center point 414 shown and described above with reference to FIG. 4, relative ranges (e.g., $R_1$, $R_2$, $R_3$, and $R_4$, shown in FIG. 4) of each of the four antenna elements 404 in the example embodiment are represented as follows: first element 404a<second element 404b<fourth element 404d<third element 404c. Instantaneous time points $t_1'$, $t_2'$, $t_3'$, and $t_4'$ are representative of the respective initial time of arrival (TOA) of calibration signal 326 for each of the four antenna elements 404. Further owing to the varying distances of each of the four antenna elements 404 from client power receiver 103 center point 414, initial TOA is directly proportional to R. Thus, in the example embodiment, $t_1' < t_2' < t_4' < t_3'$ and $R_1 < R_2 < R_4 < R_3$.

The initial receipt of calibration signal 326 by each of the four antenna elements 404 at the respective instantaneous time initiates a sampling sequence by transceiver system 101 for the respective antenna element 404. If the sampling frequencies for the sampling sequence of all antenna elements 404 are substantially equal to the calibration signal 326 frequency, then the response amplitudes of respective antenna elements 404 will, on average and over a finite period of time (e.g., burst time 506), also be substantially constant. Moreover, in the example embodiment, initial and subsequent sample points (e.g., denoted $s_1$, $s_2$, $s_3$, and $s_4$ on respective time axes of plots 606-612) will have sampling periods that are substantially equal to waveform period 604. A plurality of sample points are generated as the sampling sequence for each antenna element 404 continues for at least the burst time 506. As such, transceiver system 101 implements sampling sequence for each antenna element 404 and measures, computes, and/or stores in memory respective initial TOA and response amplitude values, which enable transceiver system 101 to measure, compute, and/or store in memory phases, receive signal strength indictors (RSSI), and errors in these and other pertinent values for the received calibration signal 326. Thus, initial TOA, response amplitudes, and other pertinent physical characteristics of the signal waveform received at each antenna element 404 represent values of respective waveform characteristics from which further derived values such as phases and RSSI are determinable according to methods and processes described herein.

In the example embodiment, each antenna element 404 provides a respective input to transceiver system 101 (including a processor thereof, shown in FIG. 9) to measure, compute, and/or store determine values of initial TOA, response amplitude, RSSI, phases, and errors. Thus, an M=N=2 antenna array 104 provides four data points for each such measurement at each sampling point ($s_1$, $s_2$, $s_3$, and $s_4$), while an M=N=100 provides 1000 data points for each such measurement at each sampling point ($s_1$, $s_2$, $s_3$, and $s_4$).

Figure 7A:
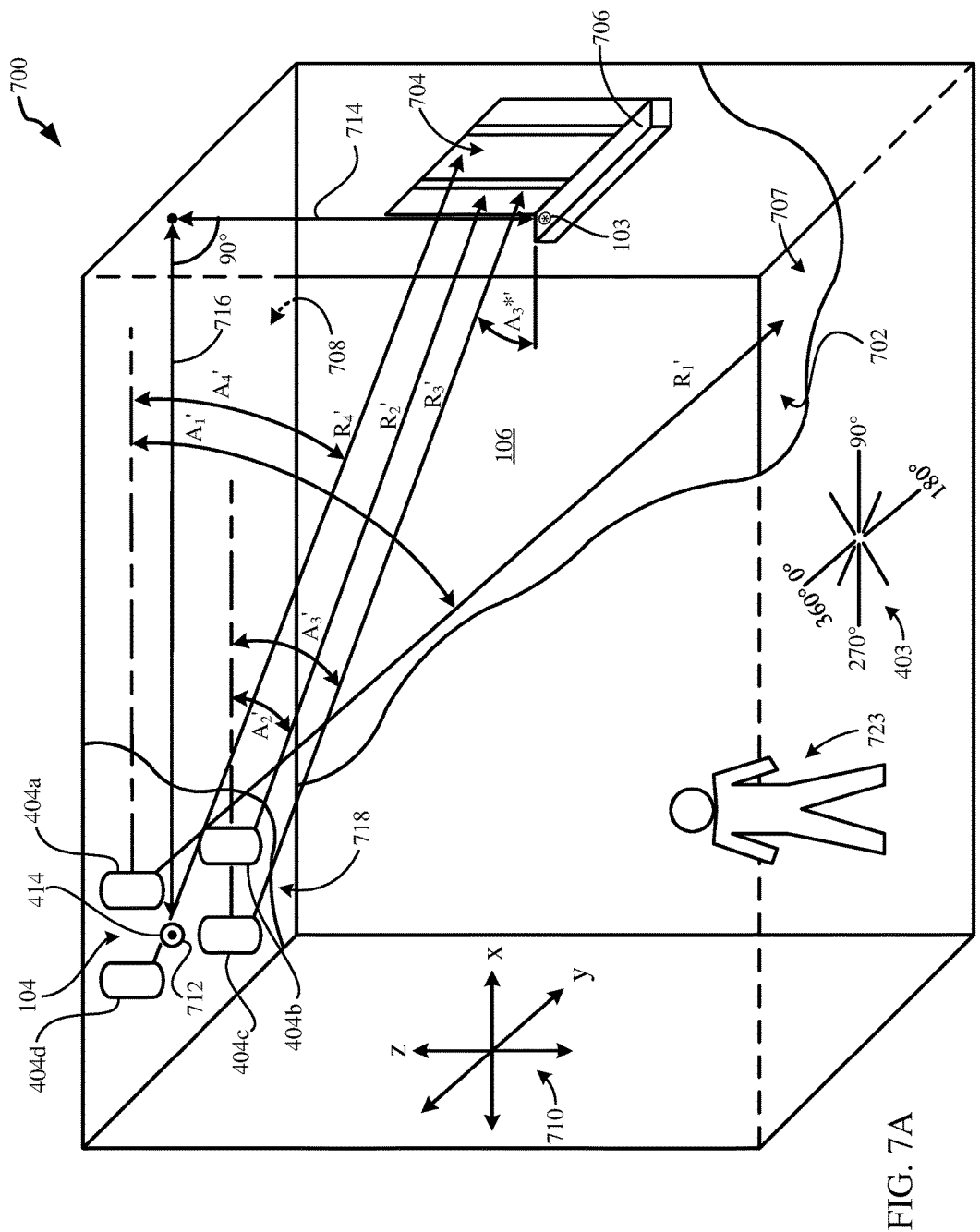
FIG. 7A is a diagram illustrating an example wireless communication and power delivery environment in accordance with an embodiment.
Figure 7B:
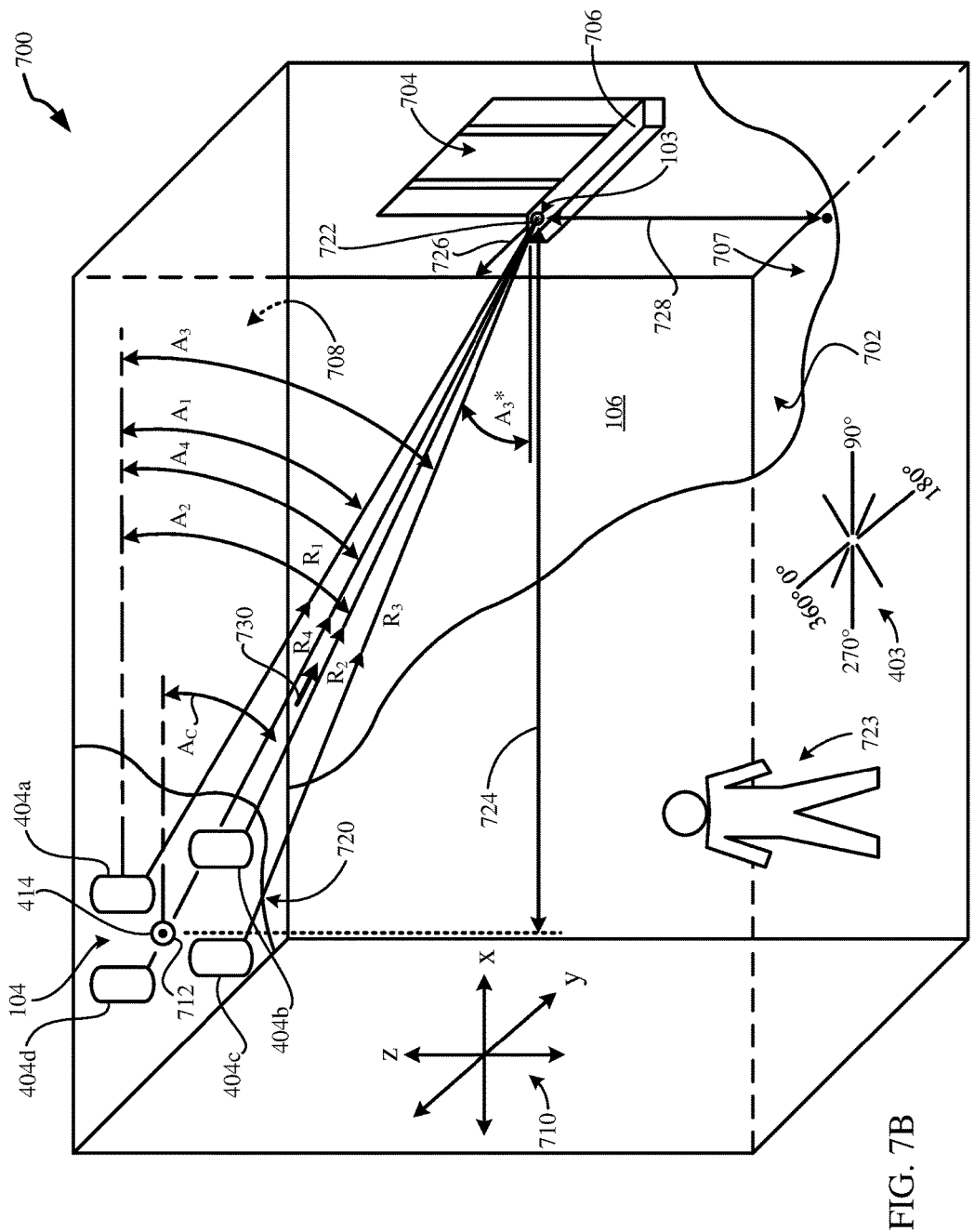
FIG. 7B is a diagram illustrating an example wireless communication and power delivery environment in accordance with an embodiment.

FIGS. 7A and 7B are diagrams illustrating an example wireless communication and power delivery environment 700 in accordance with an embodiment (e.g., environment 400 embodied in a 3D space such as a room 702 having a window 704 with a window sill 706, and reflective surfaces 106 including walls, a floor 707, and a ceiling 708). In the example embodiment, antenna array 104 is fixed to ceiling 708 and includes four antenna elements 404 having the substantially symmetrical geometry shown and described above with reference to FIG. 4. On a distal side of room 702 from antenna array 104 in transceiver system 101 (not shown), client power receiver 103 of a client device 102 (not shown) is positioned on window sill 706 in LOS with antenna array 104. As the length, width, and height of room 702 are static, and both antenna array 104 and client power receiver 103 are not in motion, client power receiver 103 and antenna array 104 center point 414 are both located at fixed ascertainable locations on an x, y, z axis 710 representative of the 3D space of room 702 and relative to an arbitrarily-assigned origin 712 thereof. In the example embodiment, the origin 712 is assigned to be at the center point 414. In other embodiments, not shown, the origin is assigned to be at a place in room 702 other than center point 414.

As shown and described above with reference to FIGS. 4 and 6, client power receiver 103 transmits beacon signal 324 and/or calibration signal 326 to each antenna element 404 of antenna array 104, and an initial TOA at each element 404 is directly proportional to respective range (R) that client power receiver 103 is from each element 404. In a 3D space such as room 702, range values define hypotenuses of right triangular planes if client power receiver 103 and each element 404 do not reside in the same two-dimensional (2D)

plane. Thus, in the embodiment shown in FIG. 7A, center point 414 is positioned above and distal from client power receiver 103 by a height 714 and lateral distance 716, respectively, and an R value from center point 414 to client power receiver 103 forms the hypotenuse.

Also owing to the different distances (R) of each antenna element 404 from client power receiver 103, an angle between a line segment defining the lateral distance 716 for a respective element 404 and a line segment defining R for the respective element 404 (denoted as an arrow in FIGS. 7A and 7B) is different for each element 404 of antenna array 104. With respect to each element 404 of the four elements (404a-404d) in the example embodiment, these angles (or their complements, e.g., denoted $A_3^{*\prime}$ and $A_3^*$ in FIGS. 7A and 7B) are representative of angle of arrival (AOA) at antenna array 104 of beacon signal 324 and/or calibration signal 326. AOA is determined by transceiver system 101 by, for example, using antenna elements 404 enabled to sense an angular displacement current of the element 404 response to incident beacon signal 324 and/or calibration signal 326. Further owing to the different distances (R) of each antenna element 404 from client power receiver 103, and as shown and described above with reference to FIG. 4, the incidence azimuthal direction 403 is different for each element 404 of antenna array 104.

FIG. 7A further depicts a rough localization process 718 in which transceiver system 101 implements a signal detection process and a sampling sequence on beacon signal 324 in a substantially similar manner as shown and described in FIG. 6 for signal detection process 600, but with a different sampling frequency and sampling period. During rough localization process 718, for each antenna element 404, transceiver system 101 measures, computes, and/or stores in memory respective initial TOA and response amplitude values, which enable transceiver system 101 to measure, compute, and/or store in memory initial phases, initial RSSI, and initial errors in these and other pertinent values for the received beacon signal 324. Also during rough localization process 718, transceiver system 101 determines initial range values (e.g., $R_1'$, $R_2'$, $R_3'$, and $R_4'$), initial AOA values ($A_1'$, $A_2'$, $A_3'$, and $A_4'$), and initial beacon signal 324 incidence azimuthal directions 403 for each antenna element 404 of the four antenna elements (404a-404d). These initial values measured and/or computed by transceiver system 101 provide an initial estimated x, y, z, axis 710 location relative to origin 712 of client power receiver 103 in environment 700, and they are subsequently used during implementation of a fine localization process 720 as shown in FIG. 7B.

During fine localization process 720, transceiver system 101 implements the signal detection process 600 and the sampling sequence on calibration signal 326 as shown and described in FIG. 6. Also during rough localization process 718, transceiver system 101 determines final range values ($R_1$, $R_2$, $R_3$, and $R_4$), final AOA values ($A_1$, $A_2$, $A_3$, and $A_4$), and final calibration signal 326 incidence azimuthal directions 403 for each antenna element 404 of the four antenna elements (404a-404d). These final values measured and/or computed by transceiver system 101 provide a final determined x, y, z, axis 710 location (with a final computed error value) relative to origin 712 in environment 700. Determination by transceiver system 101 of the final determined location of client power receiver 103 includes determining an intersection point 722 in 3D space of the line segments defining final determined ranges $R_1$, $R_2$, $R_3$, and $R_4$ for first 404a, second 404b, third 404c, and fourth 404b antenna elements.

Figure 8:
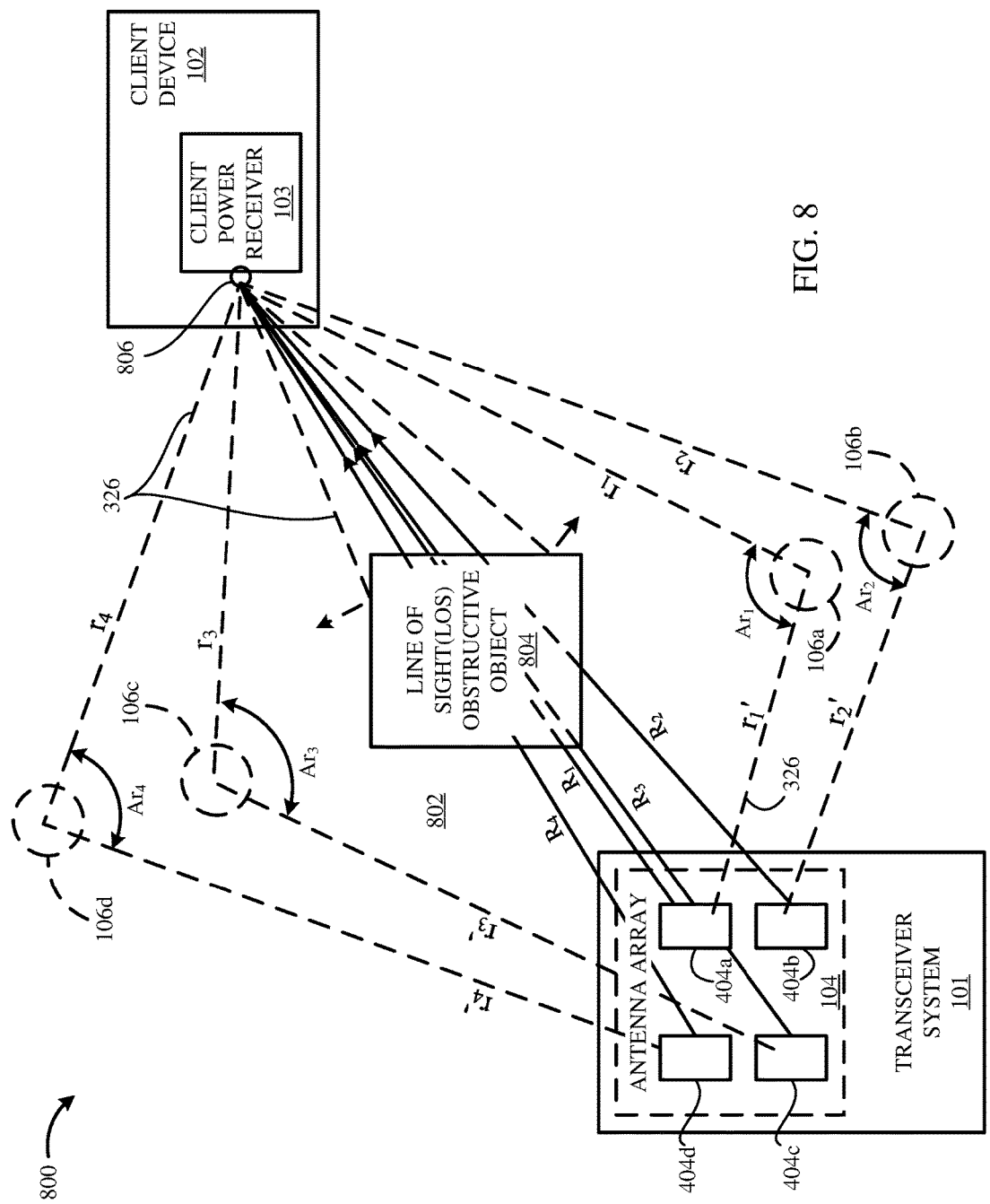
FIG. 8 is a diagram illustrating an example non-line-of sight (NLOS) beacon localization process implemented by the transceiver system in accordance with an embodiment.

Using the determined intersection point 722 and a known model of the 3D space (e.g., room 702), transceiver system 101 converts the final determined x, y, z axis 710 location values into user-friendly values for client device 102 location that are more readily comprehended and more useful by a user 723 of the WPTS system. In the example embodiment, user-friendly values include an x-distance 724 from center point 414, a y-distance 726 from center point 414, a z-elevation 728 above floor 707, and a determined location (e.g., assigned using the processes and methods described herein) of client power receiver 103, and thus client device 102, in environment 700. User-friendly values may be displayed on a display device (shown in FIG. 9) of transceiver system 101 that is visible to user 723 and/or they may be transmitted to a computing device such as a laptop or desktop computer (not shown in FIG. 7B) that is communicatively coupled to transceiver system 101. In other embodiments (e.g., as shown in FIG. 8), transceiver system 101 employs a 3D scanner array (shown in FIG. 9, and including, for example and without limitation, scanning infrared (IR) and/or laser range-finding 3D mapping systems) to generate a detailed model of 3D spaces such as room 702. In such other embodiments, user 723 may interact with the 3D model stored in transceiver system 101 to assign identifiers to portions (e.g., window sill 706) of the 3D model and also assign a name (e.g., master bedroom) to the 3D model. In still other embodiments, transceiver device 101 assigns identifiers and/or names to the 3D model which are dynamically assigned as objects and/or other attributes of the respective 3D space change over time.

Thus, user 723 is able to quickly locate his or her client device 102 in the event it is misplaced and cannot be found after a brief cursory search. Furthermore, determining the location of client power receiver 103 enables antenna array 104 to more precisely steer and/or focus transmitted signal waveforms toward client device 102, so as to improve efficiency, speed, and effectiveness of data communication and power delivery. Thus, for example, transceiver system 101 is capable of computing a reciprocal vector 730 having x, y, and z components and representing the shortest LOS return signal transmission path to client power receiver 103. For example, reciprocal vector 730 can be used by transceiver system 101 to determine a most efficient LOS radiation pattern for elements 404 of antenna array 104 to deliver power to client power receiver 103.

In still other embodiments, transceiver system 101 does not perform rough localization process 718 before performing fine localization process 720, or may perform a greater number of iterations of rough localization process 718 to reduce the initial error in the initial estimated x, y, z, axis 710 location relative to origin 712 of client power receiver 103 in environment 700 (e.g., when user 723 has more time to find the misplaced client device 102 and is not in need of improved data communication with and/or power delivery from transceiver system 101). In any event, user 723 is capable of configuring transceiver system 101 to perform one of both of rough 718 and fine 720 localization processes to suit his or her needs at any particular time. In addition to using computing devices communicatively coupled and/or networked with transceiver system 101, such configuration by user 723 may be carried out by via a handheld and/or or wall-mounted remote control transmitter (not shown in FIGS. 7A and 7B) communicatively coupled to transceiver system 101.

FIG. 8 is a diagram illustrating an example non-LOS (NLOS) localization process 800 implemented by transceiver system 101 in accordance with an embodiment. In the example embodiment, transceiver system 101 and client power receiver 103 are situated relative to one another in a non-LOS (NLOS) environment 802, where an LOS between them is prevented by an LOS-obstructive object 804. Client power receiver 103 is located in a fixed position at ranges ($R_1$-$R_4$) from each of the four antenna elements (404a-404d) of the fixed-location antenna array 104. However, due to the presence of LOS-obstructive object 804, the transceiver system 101 is unable to implement processes and methods as shown and described above with respect to FIGS. 7A and 7B. NLOS localization process 800 is a modified form of those localization processes shown and described above with reference to FIGS. 7A and 7B which accommodates the presence of LOS-obstructive object 804 to indirectly compute $R_1$-$R_4$ using additional process computations.

As shown and described above with reference to FIGS. 4 and 6, client power receiver 103 transmits beacon signal 324 and/or calibration signal 326, but these signals are received by antenna array 104 only by way of one or more reflections from a plurality of reflective surfaces 106 in NLOS environment. For example, first antenna element 404a is positioned from a first reflective surface 106a by a first reflect-to-receive distance ($r_1'$) and client power receiver 103 is positioned from the first reflective surface 106a by a first transmit-to-reflect distance ($r_1$). Thus, beacon signal 324 transmitted from client power receiver 103 reflects from the first reflective surface 106a after following a first part path of distance $r_1$, and then the beacon signal 324 follows of a second part path of distance $r_1'$ to the first element 404a.

Dashed line segments defining $r_1'$ and $r_1$ in FIG. 8 form a first reflection angle $Ar_1$ and the line segment defining $R_1$ defines a third side (length determinable as an LOS range value, $R_1$) of a resulting triangular plane defined by these three line segments. Substantially similar geometric relations hold for second 404b, third 404c, and fourth 404d elements in the example embodiment. Transceiver system 101 stores measured and/or computed values of reflect-to-receive distances ($r_1'$-$r_4'$), transmit-to-reflect distances ($r_1$-$r_4$), and reflection angles ($Ar_1$-$Ar_4$) as data in a memory for subsequent computations and to be referenced by user 723 for purposes of, for example, troubleshooting and maintenance.

Using properties of triangles, and if one or more reflection angle ($A_{r1}$, $A_{r2}$, $A_{r3}$, and/or $A_{r4}$) is a 90° angle, trigonometry, the actual range values ($R_1$-$R_4$) can be computed by transceiver system 101. For example, and without limitation, based on determined initial TOA values ($t_1'$-$t_4'$), total calibration signal 326 (or beacon signal 324) path lengths (e.g., $r_1$+$r_1'$) for each of the four antenna elements (404a-404d) are computed by transceiver system 101. Then using an appropriate triangle property and/or trigonometric identity for each of the resulting triangular planes, the respective final range values ($R_1$-$R_4$) are computed by transceiver system 101. Results of these additional computations of NLOS localization process 800 are used along with values determined by transceiver system 101 for final calibration signal 326 (or beacon signal 324) incidence azimuthal directions 403, values for response amplitudes $A_1$(t)-$A_4$(t), AOA values ($A_1$-$A_4$), respective final values for phase and RSSI, and final error values to determine an intersection point 806, and thus a final location in NLOS environment 700 on the x, y, and z axis 710 relative to origin 712 (substantially as shown and described above with reference to FIGS. 7A and 7B).

In other embodiments, transceiver system 101 implements an NLOS localization process 800 iteratively whereby transceiver system 101 initial assumes that each respective Tx and Rx path for each antenna element 404 to/from client power receiver 103 includes one reflective surface 106. If this initial assumption does not enable transceiver system 101 to measure and/or compute, with an acceptable error, at least one of the respective values for t', $r_1'$ $r_1$, R, incidence azimuthal direction 403, $A_r$, A(t), A, $A_r$, phase, RSSI, and any other value pertinent to the beacon localization methods and processes described herein, then transceiver system 101 next assumes that there are two reflective surfaces 106 for the respective Tx and Rx path. Transceiver system 101 iterates in this manner for each antenna element 404 of antenna array 104 (e.g., first assuming one reflective surface 106, then two if the assumption of one is not successful, then three . . . , etc., up to a predetermined maximum number of reflective surfaces 106 to assume) until respective values of R, the intersection point 806, and the final location of client power receiver 103 in NLOS environment 700 are determined with an acceptable error value.

In the above described iterative embodiment of process 800, further assumptions made by transceiver system 101 about the number of reflective surfaces 106 affecting respective Tx and Rx transmission paths for each antenna element 404 may be made based on data stored about the 3D space environment 802. In yet other embodiments, the aforementioned assumptions may also be made by transceiver system 101 based on updated data obtained from a 3D scanner array (shown in FIG. 9) about 3D space (e.g., room 702) that is acquired prior to or during process 800 and serves to detect and characterize the presence of LOS-obstructive object 804, as well as its impact on Tx and Rx paths to/from client power receiver 103 and transceiver system 101. For example, transceiver system 101 may use the updated 3D scanner array data to determine one or more probable reflective paths having the strongest RSSI upon receipt at antenna array 104, as well as the numbers and locations of reflective surfaces 106 for each respective Tx and Rx path for each element 404 of the antenna array 104. Thus, in cases where at least one element 404 has a strongest RSSI Tx/Rx path with client power receiver 103 having two or more reflective surfaces 106, iteratively performing process 800 enables transceiver system 101 to locate the source of the beacon 324 and/or calibration 326 signal, and thus the location of client power receiver 103, more quickly and with a lesser error as compared to process 800 performed non-iteratively.

Figure 9:
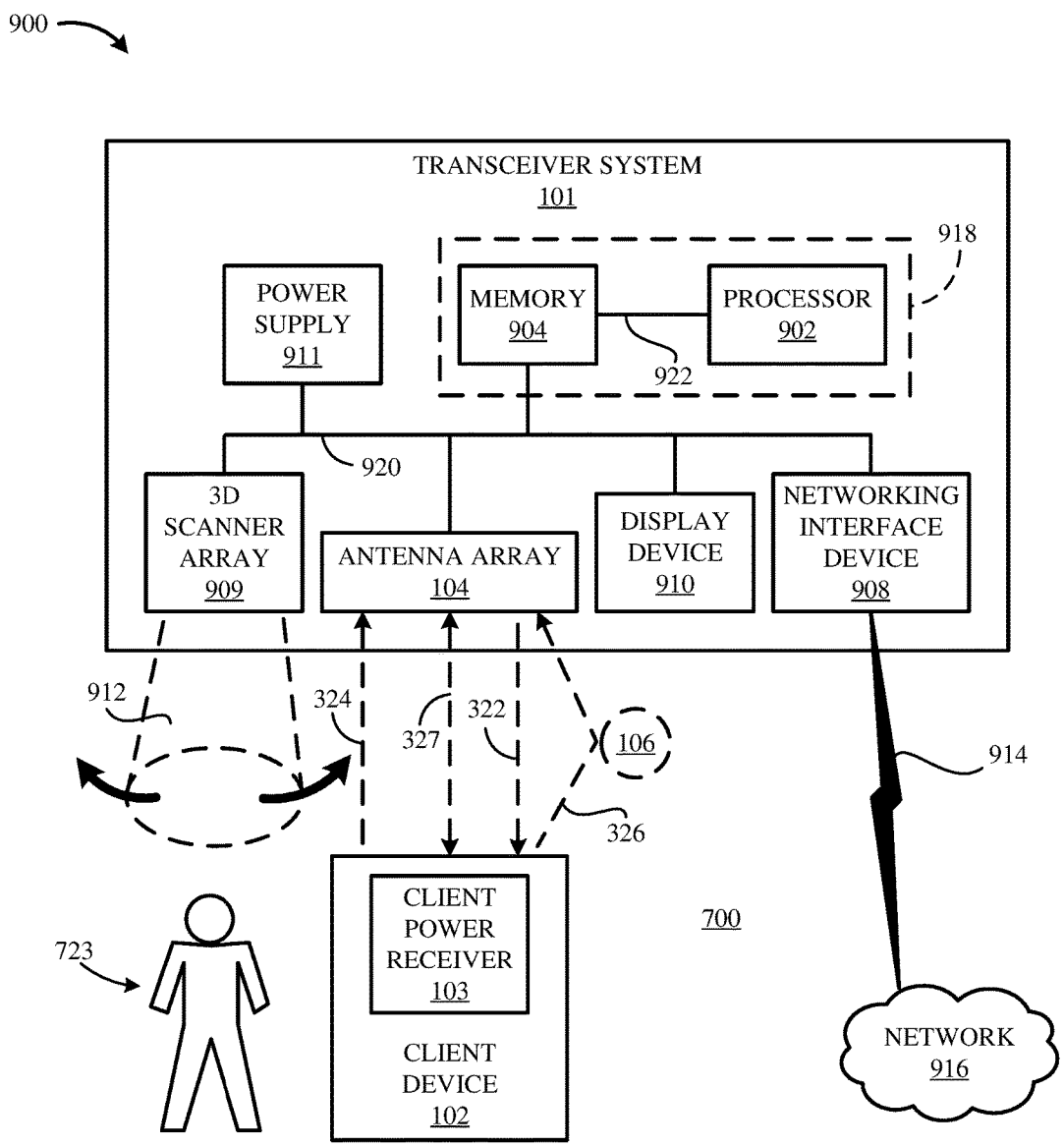
FIG. 9 is a block diagram illustrating an example transceiver system in accordance with an embodiment.

FIG. 9 is a block diagram illustrating an example transceiver system 900 in accordance with an embodiment (e.g., transceiver system 101 shown in FIGS. 1-5, and 8). The transceiver system 101 includes various functional components such as analog and digital electronic devices that are at least one of electrically and communicatively coupled together. The functional components of transceiver system 101 include a processor 902 and a memory 904 (including, e.g., a non-transitory processor-readable medium). Memory 904 stores various types and classes of data generated through, for example, the systems, methods, and processed described herein. Memory 904 also stores program instructions (e.g., software and/or firmware) that, when executed by processor 902, cause the processor 902 to manipulate (e.g., read, write, and delete operations, and combinations thereof) data stored in memory 904 and data stored in other transceiver system 101 components (e.g., data stored in registers and other data storage media thereof) associated with and/or communicatively coupled to processor 902 and/or memory 904. Through these data manipulations and other computation-related actions of processor 902 (e.g., carried out by an arithmetic logic unit and/or CPU of processor 902), the program instructions direct the implementation of the methods and processes herein described.

Transceiver system 101 also includes a network interface device 908 which is capable of receiving and transmitting data over a wired or wireless network communications protocol, including data retrieved from and/or stored in memory 904 that is received from and/or transmitted to, respectively, client device 102 and/or a cloud-based application. In the example embodiment, transceiver system 101 further includes a 3D scanner array 909 capable of generating a detailed model of environment 700 as precise and accurate as a data acquisition precision and accuracy of 3D scanner array 909. 3D scanner array 909 provides functional benefits to user 723 of client device 102 and transceiver system 101, including substantially as shown and described above with reference to FIGS. 7A, 7B, and 8. Transceiver system 101 also includes a display device 910 providing functional benefits to user 723 of transceiver system 101, including substantially as shown and described above with reference to FIGS. 7A and 7B. Furthermore, transceiver system 101 includes a power supply 911 which provides appropriate levels of electric power to network interface device 908, 3D scanner array 909, antenna array 104, processor 902, and, as needed, memory 904.

In response to above-described events including receipt of beacon signal 324 at antenna array 104, processor 902 executes the program instructions to implement the methods and processes described herein. These systems and methods utilize each antenna element 404 of the antenna array 104 and as such, processor 902 is further programmed to direct, on an element 404-by-element 404 basis, each element 404 of antenna array 104 to receive signals (e.g., beacon 324 and/or calibration 326 signal) from client receiver(s) 103. Additional events such as receipt, via network interface device 908, of network traffic 914 including data and/or other signals from a network 916 further cause processor 902 to execute program instructions stored in memory 904 to implement processes and methods in transceiver system 101, either instead of, or in addition to, the methods and processes herein described. Also, in the example embodiment, receipt of a signal from a user 723 computing device (e.g., in addition to, or instead of, client device 102) communicatively coupled, via network interface device 908, to processor 902 causes 3D array scanner 909 to emit an IR radiation pattern 912 in a plurality of orbital directions (denoted by arrows in FIG. 9) to generate the detailed model of a 3D space such as room 702 (not shown). Data such as ranges to a plurality of points on reflective surfaces 106 (not shown in FIG. 9) on the interior of the 3D space are stored as data in memory 904 and are used by processor 902 to generate (e.g., graphically render) the detailed model for viewing by user 723 and further for use in the methods and processes described herein. In other embodiments, processor 902 periodically emits IR radiation pattern 912 according to a predetermined scan schedule to generate the model without user 723 intervention.

In the example of FIG. 9, a computer system 918 includes processor 902 and memory 904. Various common components (e.g., cache memory) are omitted for illustrative simplicity. The computer system 918 is intended to illustrate a hardware device on which the various process and methods described herein can be implemented. The components of computer system 918 and other components of transceiver system 101 can be coupled together via a power and data bus 920 bus or through some other known or convenient device.

The processor 902 shown in FIG. 9 may be, for example, a conventional microprocessor, microcontroller, a field-programmable gate array (FPGA), and combinations thereof. One of skill in the relevant art will recognize that the terms "processor-readable (storage) medium" or "computer-readable (storage) medium" include any type of device that is accessible by processor 902. Memory 904 is communicatively coupled to processor 902 by, for example, a memory bus 922. In addition to non-transitory media, the memory 904 can include, by way of example but not limitation, random access memory (RAM), such as dynamic RAM (DRAM) and static RAM (SRAM). The memory 904 can be local, remote, or distributed. Non-transitory (e.g., non-volatile) memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory 904 during execution of program instructions by processor 902. The non-volatile memory can be local, remote, or distributed.

Program instructions (e.g., software) is typically stored in non-volatile portions of memory 904 and/or a drive unit (not shown in FIG. 9). Indeed, for large programs, it may not even be possible to store the entire program in the memory 904. Nevertheless, it should be understood that for software to run, if necessary, it is moved to a processor 902-readable location appropriate for processing, and for illustrative purposes, that location is referred herein to as the memory 904. Even when software is moved to the memory 904 for execution, the processor 902 will typically make use of hardware registers to store values associated with the software, and further will cache those values locally to, ideally, speed up execution of program instructions and related operations with respect to memory 904. As used herein, a software program is assumed to be stored at any known or convenient location (from non-volatile storage to hardware registers) when the software program is referred to as "executed by and implemented in a processor 902-readable medium,", and similar terminology. A processor such as processor 902 is considered to be "configured to execute a program" when at least one value associated with the program is stored in a register readable by the processor.

The bus (e.g., data carrying portions of power and data bus 920) also couples the processor 902 and, optionally, the memory 904 to the network interface device 908. The network interface device 908 can include one or more of a modem or network interface. It will be appreciated that a modem or network interface can be considered to be part of the computer system 918. The network interface device 908 can include an analog modem, ISDN modem, cable modem, token ring interface, satellite transmission interface (e.g., "direct PC"), or other interfaces for coupling computer system 918 to other computer systems. The network interface device 908 can include one or more input and/or output (I/O) devices. The I/O devices can include, by way of example but not limitation, a keyboard, a mouse or other pointing device, disk drives, printers, a scanner, and other input and/or output devices, including display device 910. The display device 910 can include, by way of example but not limitation, a cathode ray tube (CRT), liquid crystal display (LCD), or some other applicable known or convenient display device. For simplicity, it is assumed that controllers of any devices not depicted in the example of FIG. 9 reside in the transceiver device 101.

In operation, the computer system 918 can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in non-volatile portions of memory 904 and/or drive unit, and causes the processor 902 to execute the various acts required by the operating system to input and output data and to store data in the memory 904, including storing files on the non-volatile memory and/or drive unit.

Figure 10:
FIG. 10 is a block diagram illustrating an example data table algorithm processing and software architecture in accordance with an embodiment.

FIG. 10 is a block diagram illustrating an example data table algorithm processing and software architecture 1000 implemented by processor 902 and memory 904 in accordance with an embodiment. The eight blocks shown in FIG. 10 are example data table sets (e.g., table sets 1002-1016), which are stored in memory 904 and are used by the processor 902 of transceiver system 101 to communicate with and calibrate signal Tx and Rx between the client power receiver 103 and antenna array 104. When the client power receiver 103 is transmitting beacon signal 324, transceiver system 101 is in a listening mode (e.g., receiving signals from client power receiver 103). When a predetermined tone of beacon signal 324 and/or calibration signal 326 is detected by transceiver system 101, a last known location of client power receiver 103 is queued from a table set 1002. Also, while transceiver system 101 is in the listening mode, the phase and RSSI of received beacon signal 324 and/or calibration signal 326 are determined by processor 902 for each respective antenna element 404, and the resulting values for phases, RSSIs, and computed conjugate phases are stored in table sets 1006, 1010, and 1012, respectively, and tagged for their respective corresponding element 404. In cases where a plurality of client power receivers 103 are present in, for example, environment 100, table sets 1006 and 1010 each further contain respective sub-tables tagged for each of the plurality of client power receivers 103.

The processor 902 stores beacon and/or calibration schedules in a table set 1004. As described above, the beaconing schedule may dictate a timing of power delivery as part of the WPTS following a power delivery schedule stored in a table set 1016. A table set 1014 stores data values of MARKOV counter values which are updated by processor 902 for continuous predictability of amplitude and phase for beacon 324 and/or calibration 326 signals received by respective elements 404 of antenna array 104. Data table algorithm processing and software architecture 1000 is based on the next signal being compared to the most recent value stored in the respective data table as compared to what it should be for continuous signal path contact between transceiver system 101 and client power receiver 103.

Also, in the example embodiment, values stored in table sets 1010 and 1014 are evaluated for client power receiver 103 location change (e.g., movement). If movement detection results during processor 902 implementing data table algorithm processing and software architecture 1000, then one or more of the above described beacon localization processes (e.g., a recalibration process) are again initiated for the respective client power receiver 103 whose movement was detected. A table set 1008 contains parameters for a watch dog timer to keep the program instructions (e.g., software) being executed by processor 902 program aware of the overall software architecture and the need for proper sequencing of the table data. Table set 1008 also stores predetermined program instruction interrupt time points (e.g., implemented by dedicated timers and/or counters in processor 902, including watch dog timer) which point the processor 902 to the proper algorithm when it is necessary to update values in respective tables of the eight table sets (1002-1016) of data table algorithm processing and software architecture 1000.

Figure 11:
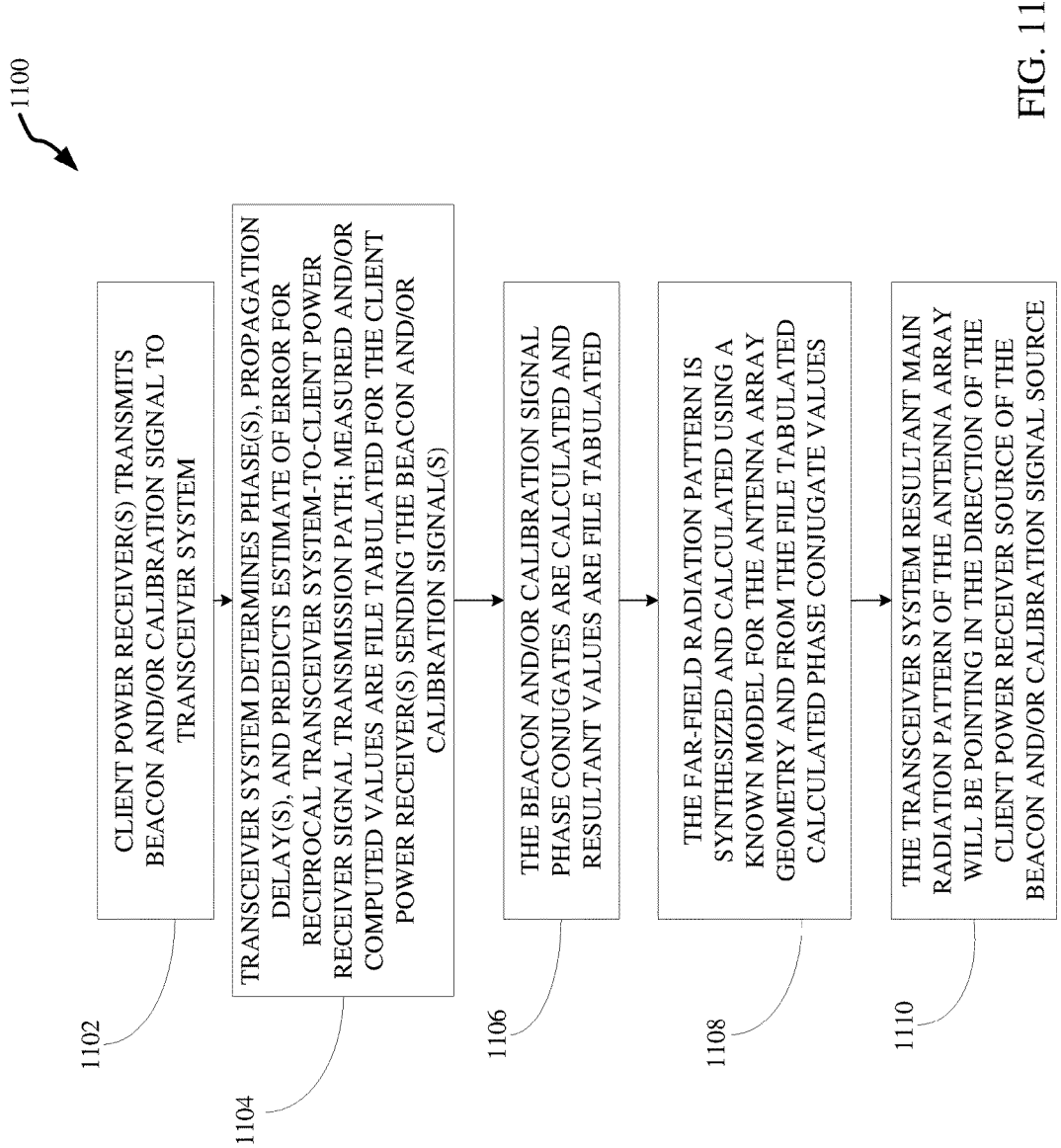
FIG. 11 is a flow diagram illustrating an example beacon localization method in accordance with an embodiment.

FIG. 11 is a flow diagram illustrating an example beacon localization method 1100 implemented by transceiver system 101 in accordance with an embodiment. In the example embodiment, method 1100 includes a step 1102 during which client power receiver 103 transmits beacon 324 and/or calibration 326 signal to the transceiver system 101. Client power receiver 103 transmits the beacon 324 and/or calibration 326 signal in response to a beacon and/or calibration schedule received by the client power receiver 103 from transceiver system 101. Method 1100 also includes a step 1104 during which the transceiver system 101, based, at least in part, on measured and/or processor 902-computed characteristics of beacon 324 and/or calibration 326 signal, determines the phase angle of the transmission path of beacon 324 and/or calibration 326 signal into 3D space. In the example embodiment, step 1104 also includes determining propagation delay(s) for received beacon 324 and/or calibration 326 signal(s), as well as determining the phase error estimate for a reciprocal transmission path (e.g., a return path) of at least one of data signal 327 and power transmission signal 322 from transceiver system 101 to client power receiver 103. Processor 902 iteratively and repeatedly performs step 1104 to constantly update the determined values of the phase angle, the propagation delay, and the phase error estimate.

Method 1100 further includes a step 1106 during which one or more of the values determined during step 1104 are used to calculate the complex phase conjugates for each antenna element 404 of a plurality of elements (404*a*-404*d*) of antenna array 104 of the transceiver system 101. Method 1100 also includes a step 1108 during which a far-field radiation pattern is synthesized (e.g., determined by processor 902) for the antenna array 104 geometry from values determined and calculated in at least one of steps 1104 and 1106. Method 1100 further includes generating a resultant main radiation pattern corresponding to the far-field radiation pattern synthesized during step 1108. Also during step 1110, transceiver system 101, via the antenna array 104, collimates and steers the generated main radiation pattern to point in a determined direction (e.g., represented by a vector having x, y, and z components) that the beacon 324 and/or calibration 326 signal was received from. Further, in the example embodiment, performance of method 1100 by transceiver system 101 provides a constant vigilance for detecting movement of client power receiver 103 by calling the calibration and localization process routines for respective client power receiver 103 for which movement is detected or loss of path signal occurs.

Figure 12:
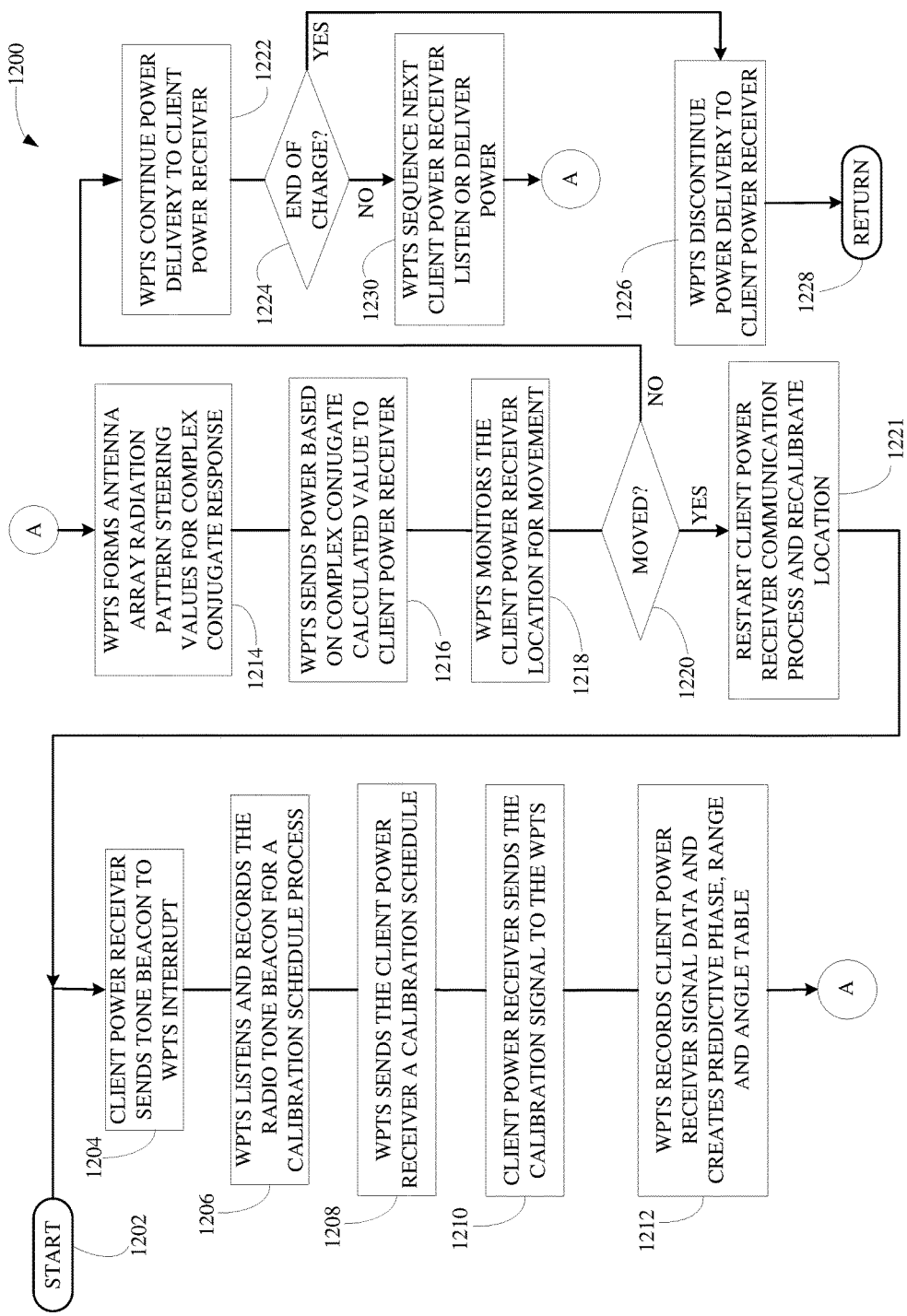
FIG. 12 is a flow diagram including logical states which illustrates an example wireless power transfer system (WPTS) process in accordance with an embodiment.

FIG. 12 is a flow diagram including logical states which illustrates an example WPTS process 1200 implemented by transceiver system 101 in accordance with an embodiment. Process 1200 begins from a start state 1202 including, for example, a powered down state of at least one of transceiver system 101 and client power receiver 103. Process 1200 proceeds from start state 1202 to a step 1204 during which client power receiver 103 transmits beacon signal 324, which interrupts the program instructions being executed by processor 902. The interrupt occurring during step 1204 prompts process 1200 to proceed from step 1204 to a step 1206. During step 1206, transceiver system 101 listens for and records (e.g., stores in memory 904) the predetermined tone of beacon signal 324 corresponding to transceiver system 101 transmitting a calibration schedule to a specified client power receiver 103. During a step 1208, transceiver system 101 transmits the calibration schedule to client power receiver 103.

Next, in WPTS process 1200, client power receiver 103 transmits calibration signal 326 to transceiver system 101 during a step 1210. After step 1210, a step 1212 includes transceiver system 101 recording (e.g., storing in memory 904) calibration signal 326 data and processor 902 determining predictive phase, range, and angle values to be stored and later updated in data sets, substantially as shown and described above with reference to FIG. 10. Process 1200 proceeds from step 1212 to a step 1214, during which transceiver system 101 configures the antenna elements 404 of antenna array 104 to function as a retro-directive antennae for purposes of directing a collimated main radiation pattern in the direction (e.g., a vector having x, y, and z components) of the strongest propagation path of signal reception RSSI for the client power receiver 103. Step 1214 also includes processor 902 computing complex conjugates responses for each antenna element 404 of antenna array 104 based on measured and/or computed characteristics of incident calibration signal 326 received by each of the elements 404. With the antenna array 104 so configured, process 1200 proceeds from step 1214 to a step 1216, during which transceiver system 101 transmits power transmission signal 322 (e.g., as power transmission bursts 514 and 516) to client power receiver 103 in a radiation pattern directed and/or focused along the vector direction determined in step 1214, and in accordance with the previously transmitted beacon schedule (e.g., a beacon beat sequence (BBS) cycle). Step 1216 thus facilitates efficient and effective charging of battery 304.

Following step 1216, process 1200 performs a step 1218 during which transceiver system 101 determines is client power receiver 103 has moved from a previously determined location in the environment (e.g., in a 3D space such as room 702). Step 1218 includes a first binary branch 1220 in the flow of process 1200. Thus, if movement of client power receiver 103 is detected during step 1218, process 1200 proceeds from step 1218 to a step 1221. During step 1221, transceiver system 101 restarts communications with client power receiver and recalibrates its location in the environment. Following completion of step 1221, process 1200 performs a subsequent iteration of steps 1204-1218.

If, however, movement of client power receiver 103 is not detected during step 1218, process 1200 proceeds from step 1218 to a step 1222. During step 1222, transceiver system 101 continue wireless power transfer via power transmission signal 322 in accordance with the BBS cycle. Step 1222 includes a second binary branch 1224 in the flow of process 1200. Thus, if WPTS achieves end of charge status for battery 304 (e.g., battery 304 is fully charged) during step 1222, process 1200 proceeds from step 1222 to a step 1226. During step 1226, transceiver system 101 ceases transmission of power transmission signal 322 and process 1200 proceeds from step 1226 to a return state 1228 including, without limitation, at least one of a program interrupt return and an end state. The end of charge status may also be achieved during step 1222 in cases where a first battery 304 of a first client power receiver 103 of a plurality of client power receivers 103 in the WPTS environments is not fully charged but reaches a predetermined and/or user 723 specified fraction of full charge capacity and a second client power receiver 103 in environment is determined by transceiver system 101 and/or specified by user 723 as requiring priority in receiving power transmission signal 322 from transceiver system 101.

If, however, WPTS does not achieves end of charge status for battery 304 (e.g., battery 304 is not fully charged) during step 1222, process 1200 proceeds from step 1222 to a step 1230. During step 1230, transceiver system 101 transitions to servicing another client power receiver 103 of a plurality of client power receivers 103 in the WPTS environment. Alternatively, during step 1230, transceiver system 101 recommences transmission of power transmission signal 322 to the client power receiver 103 whose battery 304 was subject to wireless charging during step 1222. Following completion of step 1230, process 1200 performs a subsequent iteration of steps 1214-1218.

FIG. 13 is a flow diagram illustrating an example transceiver system operation method 1300 implemented by transceiver system 101 in accordance with an embodiment. In the example embodiment, method 1300 includes a step 1302 during which transceiver system 101 receives, from the client power receiver 103 and at the plurality of elements 404 of the antenna array 104, a signal (e.g., beacon signal 324 and/or calibration signal 326). Method 1300 also includes a step 1304 during which at least one of the processor 902 and the antenna array 104 determines, based at least in part on the fixed geometry of the elements 404 in the antenna array 104, a value of at least one waveform characteristic of the signal (e.g., beacon signal 324 and/or calibration signal 326) received at each element 404 of the plurality of elements 404 from the client power receiver 103. Step 1304 also includes tagging and recording (e.g., storing in the memory 904) the determined value of the at least one waveform characteristic of the signal (e.g., beacon signal 324 and/or calibration signal 326) received at the each element 404 from the client power receiver 103.

Method 1300 further includes a step 1306 during which the processor 902 computes, based on the determined value of the at least one waveform characteristic, a transmission path of the signal (e.g., beacon signal 324 and/or calibration signal 326) from the client power receiver 103 to each element 404 of the plurality of elements 404 of the antenna array 104. Step 1306 also includes calculating and recording (e.g., storing in the memory 904) the transmission path of the signal (e.g., beacon signal 324 and/or calibration signal 326) from the client power receiver 103 to the each element 404. Method 1300 also includes a step 1308 during which the processor 902 assigns, based on the computed transmission path, a location of the client power receiver 103 in the environment (e.g., the 3D space of environment 700). Step 1308 also includes establishing a vector direction (e.g., reciprocal vector 730) for which to synthesize and generate a main radiation pattern for a transceiver system 101 signal (e.g., power transmission signal 322) transmitted from the antenna array 104 to the client power receiver 103.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may thus be implemented using a variety of programming languages.

In alternative embodiments, the machine operates as a standalone device or may be connected (e.g., networked) to other machines. In a networked deployment, the machine may operate in the capacity of a server or a client machine in a client-server network environment or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the processor-readable medium or processor-readable storage medium is shown in an exemplary embodiment to be a single medium, the terms "processor-readable medium" and "processor-readable storage medium" should be taken to include a single medium or multiple media (e.g., a centralized or distributed database, and/or associated caches and servers) that store the one or more sets of program instructions. The term "processor-readable medium" and "processor-readable storage medium" shall also be taken to include any medium that is capable of storing, encoding or carrying a set of instructions for execution by the processor and computer system to that cause those and associated devices and systems to perform any one or more of the methodologies of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative combinations or subcombinations. Each of these processes or blocks may be implemented in a variety of different ways. Also, while processes or blocks are, at times, shown as being performed in a series, these processes or blocks may instead be performed in parallel, or may be performed at different times. Further, any specific numbers noted herein are only examples: alternative implementations or combinations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. § 112, ¶6, other aspects may likewise be embodied as a means-plus-function claim, or in other forms, such as being embodied in a computer-readable medium. (Any claims intended to be treated under 35 U.S.C. § 112, ¶6 will begin with the words "means for".) Accordingly, the applicant reserves the right to add additional claims after filing the application to pursue such additional claim forms for other aspects of the disclosure.

The detailed description provided herein may be applied to other systems, not necessarily only the system described above. The elements and acts of the various examples described above can be combined to provide further implementations of the invention. Some alternative implementations of the invention may include not only additional elements to those implementations noted above, but also may include fewer elements. These and other changes can be made to the invention in light of the above Detailed Description. While the above description defines certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention.

What is claimed is:

1. A method of operating a transceiver system wirelessly communicatively coupled to a client power receiver, the transceiver system including an antenna array, a processor, and a memory, the transceiver system and the client power receiver positioned in an environment, said method comprising:
   receiving, from the client power receiver and at a plurality of elements of the antenna array, a signal, wherein each element of the plurality of elements is positioned relative to one another in a fixed geometry;
   determining, by at least one of the processor and the antenna array, and based at least in part on the fixed geometry, a value of at least one waveform characteristic of the signal received at the each element;
   computing, by the processor and based on the determined value of the at least one waveform characteristic, a transmission path of the signal from the client power receiver to the each element;
   calculating, by the processor, an intersection point based on the computed transmission path of the signal from the client power receiver to the each element; and
   assigning, by the processor and based on the intersection point, a location of the client power receiver in the environment.

2. The method of claim 1 further comprising:
   storing in the memory the determined value of the at least one waveform characteristic;
   monitoring, by the processor, a plurality of determined values of the at least one waveform characteristic determined multiple times over a period of time commencing when the client power receiver is initially positioned at a first location in the environment; and
   detecting, by the processor and based on the monitoring, a relocation of the client power receiver from the first location to a second location different from the first location.

3. The method of claim 1 further comprising storing in the memory the determined value of the at least one waveform characteristic, wherein computing a transmission path of the signal from the client power receiver to the each element comprises:
   computing and storing in the memory, and based on the stored value of the at least one waveform characteristic, a value of a range from the each element to the client power receiver; and
   calculating and storing in the memory, and based on at least one of the stored value of the range and the stored value of the at least one waveform characteristic, a reciprocal vector direction from the each element to the client power receiver.

4. The method of claim 3, wherein no more than two elements in the fixed geometry are positioned in the environment equidistant from the client power receiver, and wherein:
   determining a value of at least one waveform characteristic of the signal comprises determining and storing in the memory a value of an initial time of arrival (TOA) of the signal at the each element; and
   computing a value of the range comprises computing the value of the range based on the value of the initial TOA.

5. The method of claim 3 further comprising:
   determining and storing in the memory, by at least one of the processor and the antenna array, a radiation pattern based at least in part on the value of the range and the reciprocal vector direction; and transmitting a signal from the antenna array to the client power receiver in accordance with the determined radiation pattern.

6. The method of claim 3, wherein the intersection point defines a location in the environment at which a plurality of line segments at least one of: intersect and meet, distal the antenna array proximate respective line segment endpoints, each line segment of the plurality of line segments drawn from and extending away from the antenna array in a direction substantially equal to the respective reciprocal vector direction, and wherein a length between the each element and a respective line segment endpoint of the plurality of line segment endpoints is substantially equal to a respective computed range value.

7. The method of claim 6, wherein the environment includes a three-dimensional (3D) space, and wherein:
determining a value of at least one waveform characteristic of the signal received at the each element comprises determining a value of an angle of arrival (AOA) of the client power signal received at the each element; and
computing a transmission path of the signal from the client power receiver to the each element further comprises calculating, based on the determined AOA value, a reciprocal vector having x, y, and z direction components,
wherein the each line segment is drawn from and extends away from the antenna array in a direction substantially equal to the reciprocal vector having x, y, and z direction components.

8. The method of claim 3, wherein the environment includes a non-line-of-sight (NLOS) environment, the NLOS environment including at least one reflective surface, wherein the transmission path includes the at least one reflective surface, the signal reflecting from the at least one reflective surface after following a first part path between the client power receiver and the at least one reflective surface, the signal further following a second part path between the at least one reflective surface and the each element, and wherein computing a transmission path of the signal from the client power receiver to the each element further comprises:
computing and storing in the memory a value of a first distance between the client power receiver and a respective at least a portion of the at least one reflective surface;
computing and storing in the memory a value of a second distance between the each element and the respective at least a portion of the at least one reflective surface; and
computing and storing in the memory a value of a reflection angle between the first part path and the second part path.

9. The method of claim 8, wherein the first and second part paths and a line segment having the each element and the client power receiver as endpoints define a triangular plane, the line segment defining the range, and wherein computing a value of a range from the each element to the client power receiver comprises:
calculating, using at least one of: one or more trigonometry identities and one or more triangle properties, the length of the line segment based on at least one of the value of the first distance, the value of the second distance, and the value of the reflection angle.

10. The method of claim 1 further comprising:
assigning, by the processor and based on a three-dimensional model of the environment, an identifier to portions of the three-dimensional model corresponding to the intersection point.

11. A transceiver system positioned in an environment with a client power receiver, the transceiver system wirelessly communicatively coupled to the client power receiver, said transceiver system comprising:
an antenna array including a plurality of elements, wherein each element of the plurality of elements is positioned relative to one another in a fixed geometry;
a memory; and
a processor coupled to the memory and coupled to the antenna array, the processor configured to:
direct the each element to receive the signal from the client power receiver;
determine, based at least in part on the fixed geometry, a value of at least one waveform characteristic of the signal received at the each element;
compute, based on the determined value of the at least one waveform characteristic, a transmission path of the signal from the client power receiver to the each element;
calculate an intersection point based on the computed transmission path of the signal from the client power receiver to the each element; and
assign, based on the intersection point, a location of the client power receiver in the environment.

12. The system of claim 11 further comprising a display device coupled to the processor, the display device configured to display, to a user, the assigned location of the client power receiver in the environment.

13. The system of claim 11, wherein the processor is further configured to:
store in the memory the determined value of the at least one waveform characteristic;
monitor a plurality of determined values of the at least one waveform characteristic determined multiple times over a period of time commencing when the client power receiver is initially positioned at a first location in the environment; and
detect, based on the processor monitoring, a relocation of the client power receiver from the first location to a second location different from the first location.

14. The system of claim 11, wherein the processor is further configured to store in the memory the determined value of the at least one waveform characteristic, and wherein, to compute the transmission path of the signal from the client power receiver to the each element, the processor is further configured to:
compute and store in the memory, and based on the stored value of the at least one waveform characteristic, a value of a range from the each element to the client power receiver; and
calculate and store in the memory, and based on at least one of the stored value of the range and the stored value of the at least one waveform characteristic, a reciprocal vector direction from the each element to the client power receiver.

15. The system of claim 14, wherein no more than two elements in the fixed geometry are positioned in the environment equidistant from the client power receiver, and wherein:
to determine the value of the at least one waveform characteristic of the signal, the processor is further configured to determine and store in the memory a value of an initial time of arrival (TOA) of the signal at the each element; and to compute the value of the range, the processor is further configured to compute the value of the range based on the value of the initial TOA.

16. The system of claim 14, wherein:

the processor is further configured to determine and store in the memory a radiation pattern based at least in part on the value of the range and the reciprocal vector direction; and the antenna array is configured to transmit a signal to the client power receiver in accordance with the determined radiation pattern.

17. The system of claim 14, wherein, to assign a location of the client power receiver in the environment, the processor is further configured to calculate an intersection point, the intersection point defining a location in the environment at which a plurality of line segments at least one of: intersect and meet, distal the antenna array proximate respective line segment endpoints, each line segment of the plurality of line segments drawn from and extending away from the antenna array in a direction substantially equal to the respective reciprocal vector direction, and wherein a length between the each element and a respective line segment endpoint of the plurality of line segment endpoints is substantially equal to a respective computed range value.

18. The system of claim 17, wherein the environment includes a three-dimensional (3D) space, and wherein:

to determine the value of the at least one waveform characteristic of the signal received at the each element, the processor is further configured to determine a value of an angle of arrival (AOA) of the client power signal received at the each element; and to compute the transmission path of the signal from the client power receiver to the each element, the processor is further configured to calculate, based on the determined AOA value, a reciprocal vector having x, y, and z direction components, wherein the each line segment is drawn from and extends away from the antenna array in a direction substantially equal to the reciprocal vector having x, y, and z direction components.

19. The system of claim 14, wherein the environment includes a non-line-of-sight (NLOS) environment, the NLOS environment including at least one reflective surface, wherein the transmission path includes the at least one reflective surface, the signal reflecting from the at least one reflective surface after following a first part path between the client power receiver and the at least one reflective surface, the signal further following a second part path between the at least one reflective surface and the each element, and wherein, to compute a transmission path of the signal from the client power receiver to the each element, the processor is further configured to:

compute and store in the memory a value of a first distance between the client power receiver and a respective at least a portion of the at least one reflective surface;

compute and store in the memory a value of a second distance between the each element and the respective at least a portion of the at least one reflective surface; and compute and store in the memory a value of a reflection angle between the first part path and the second part path.

20. One or more non-transitory computer-readable storage media having stored thereon processor-executable program instructions which, when executed by a processor of a transceiver system including an antenna array coupled to the processor, cause the processor to:

direct each element of a plurality of elements of the antenna array to receive a signal from a client power receiver;

determine, based at least in part on a fixed geometry at which the each element is positioned relative to one another in the antenna array, a value of at least one waveform characteristic of the signal received at the each element;

compute, based on the determined value of the at least one waveform characteristic, a transmission path of the signal from the client power receiver to the each element;

calculate, based on the computed transmission path of the signal from the client power receiver to the each element, an intersection point; and assign, based on the intersection point, a location of the client power receiver in an environment in which the transceiver system and the client power receiver are positioned.

* * * * *